(12) United States Patent
Kobayashi

(10) Patent No.: US 12,483,810 B2
(45) Date of Patent: Nov. 25, 2025

(54) PHOTOELECTRIC CONVERSION DEVICE, PHOTOELECTRIC CONVERSION SYSTEM, MOVABLE OBJECT AND EQUIPMENT

(71) Applicant: CANON KABUSHIKI KAISHA, Tokyo (JP)

(72) Inventor: Hideo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 18/610,744

(22) Filed: Mar. 20, 2024

(65) Prior Publication Data

US 2024/0323563 A1    Sep. 26, 2024

(30) Foreign Application Priority Data

Mar. 22, 2023   (JP) ................................. 2023-045442

(51) Int. Cl.
*H04N 25/767* (2023.01)
*H04N 25/766* (2023.01)
*H04N 25/78* (2023.01)

(52) U.S. Cl.
CPC ......... *H04N 25/767* (2023.01); *H04N 25/766* (2023.01); *H04N 25/78* (2023.01)

(58) Field of Classification Search
CPC .... H04N 25/76; H04N 25/766; H04N 25/767; H04N 25/78
See application file for complete search history.

(56) References Cited

U.S. PATENT DOCUMENTS

| 2010/0315540 | A1 | 12/2010 | Hoshino |
| 2015/0312506 | A1 | 10/2015 | Okura |
| 2020/0058690 | A1* | 2/2020 | Kim ....................... H10F 39/803 |
| 2020/0244907 | A1 | 7/2020 | Ueno |
| 2020/0396402 | A1* | 12/2020 | Freson ................... H10F 39/18 |
| 2023/0326940 | A1 | 10/2023 | Kouji |
| 2024/0187755 | A1* | 6/2024 | Talbot .................... H04N 25/75 |
| 2024/0214704 | A1* | 6/2024 | Kobayashi ............. H04N 25/77 |

FOREIGN PATENT DOCUMENTS

| JP | 2010288218 A | 12/2010 |
| JP | 2015207973 A | 11/2015 |
| JP | 2019030002 A | 2/2019 |
| JP | 2022017676 A | 1/2022 |

* cited by examiner

*Primary Examiner* — Daniel M Pasiewicz

(74) *Attorney, Agent, or Firm* — Canon U.S.A., Inc. IP Division

(57) ABSTRACT

A photoelectric conversion device includes a plurality of pixels arranged to form a column, each of the plurality of pixels being configured to output a signal based on charge generated in a photoelectric conversion unit, a plurality of output lines provided corresponding to the column, each of the plurality of output lines being connected to at least one of the plurality of pixels, and a column circuit connected to the plurality of output lines. The plurality of output lines includes a first output line and a second output line. The column circuit includes a speed-up circuit configured to promote a change in potential, and a selection circuit configured to select one of the first output line and the second output line and connect the selected one to the speed-up circuit.

18 Claims, 18 Drawing Sheets

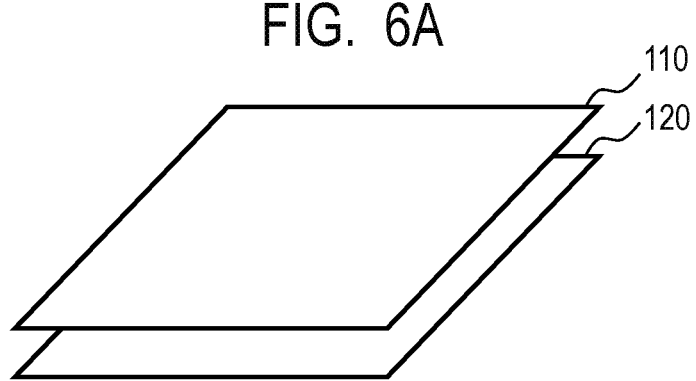
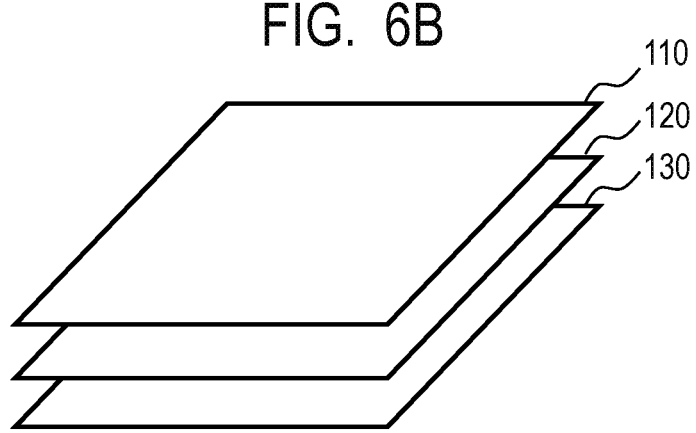

PHOTOELECTRIC CONVERSION DEVICE, PHOTOELECTRIC CONVERSION SYSTEM, MOVABLE OBJECT AND EQUIPMENT

BACKGROUND

Technical Field

One disclosed aspect of the embodiments relates to a photoelectric conversion device, a photoelectric conversion system, a movable object, and equipment.

Description of the Related Art

In a photoelectric conversion device such as a CMOS image sensor, it is required to suppress influence of parasitic capacitance accompanying an output line which outputs a pixel signal from the viewpoint of, for example, increasing an operation speed. Japanese Patent Application Laid-Open No. 2019-030002 discloses a solid-state imaging device configured to reduce influence of parasitic capacitance accompanying an output line by connecting a negative capacitance circuit to the output line.

However, in the technology described in Japanese Patent Application Laid-Open No. 2019-030002, no particular consideration is given to the case where an output line group arranged in each column includes a plurality of output lines, and it is not always possible to appropriately reduce the influence of parasitic capacitance accompanying the output lines.

SUMMARY

One disclosed aspect of the embodiments provides a technique for reducing influence of parasitic capacitance accompanying an output line in a photoelectric conversion device in which an output line group arranged in each column includes a plurality of output lines.

According to an embodiment of the present specification, a photoelectric conversion device includes a plurality of pixels, a plurality of output lines, and a column circuit. The plurality of pixels is arranged to form a column. Each of the plurality of pixels is configured to output a signal based on charge generated in a photoelectric conversion unit. The plurality of output lines is provided corresponding to the column. Each of the plurality of output lines is connected to at least one of the plurality of pixels. The column circuit is connected to the plurality of output lines. The plurality of output lines includes a first output line and a second output line. The column circuit includes a speed-up circuit configured to promote a change in potential, and a selection circuit configured to select one of the first output line and the second output line and connect the selected one to the speed-up circuit.

Further features of the disclosure will become apparent from the following description of exemplary embodiments with reference to the attached drawings.

BRIEF DESCRIPTION OF THE DRAWINGS

FIG. 6A and FIG. 6B are schematic diagrams illustrating a configuration example of the photoelectric conversion device according to the first embodiment.

DESCRIPTION OF THE EMBODIMENTS

Embodiments of the disclosure will now be described in detail in accordance with the accompanying drawings. In the following, the term "unit" may refer to a circuit, a subsystem, an assembly, or a functional component that performs the associated function.

First Embodiment

Figure 1:
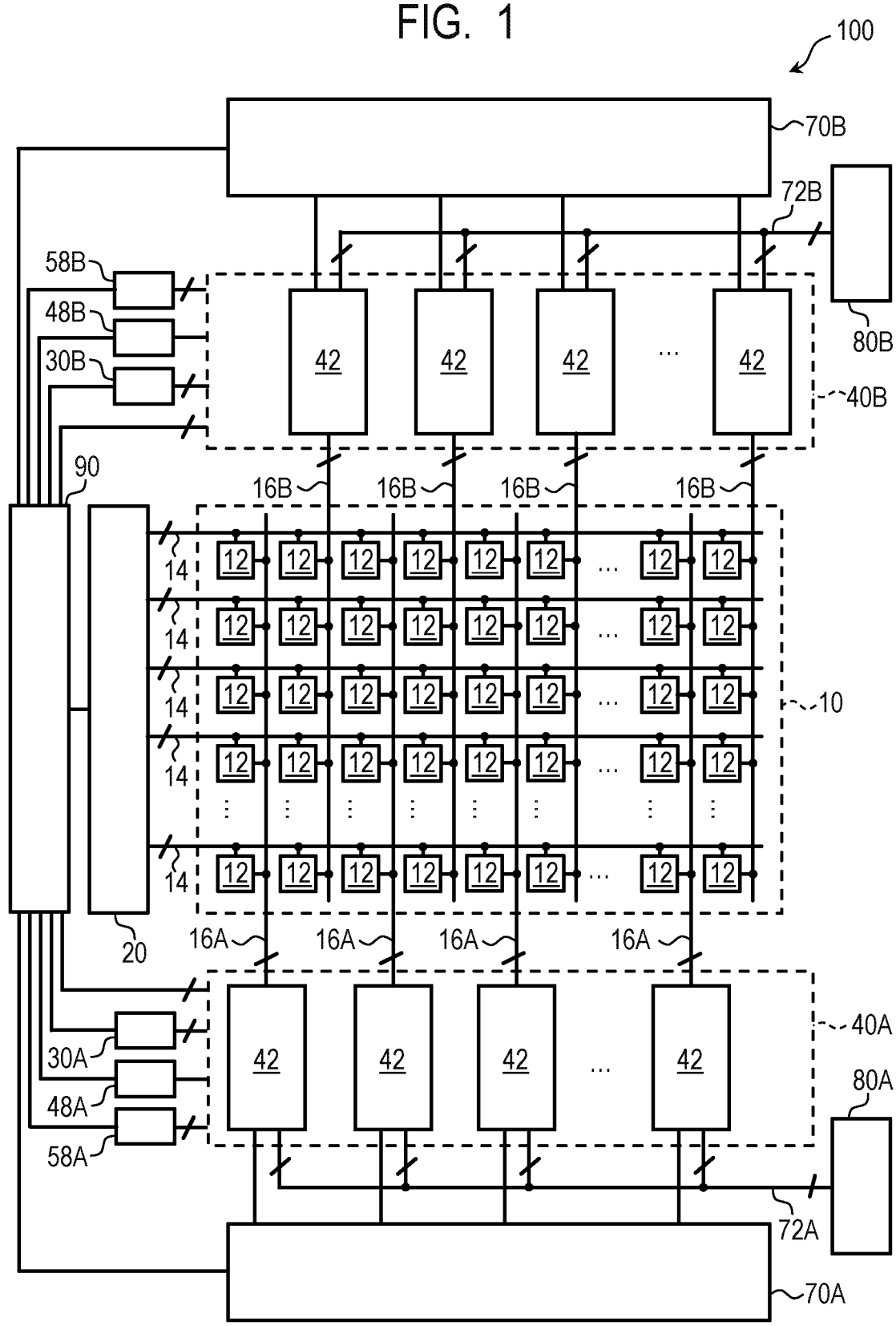
FIG. 1 is a block diagram illustrating a schematic configuration of a photoelectric conversion device according to a first embodiment.
Figure 2:
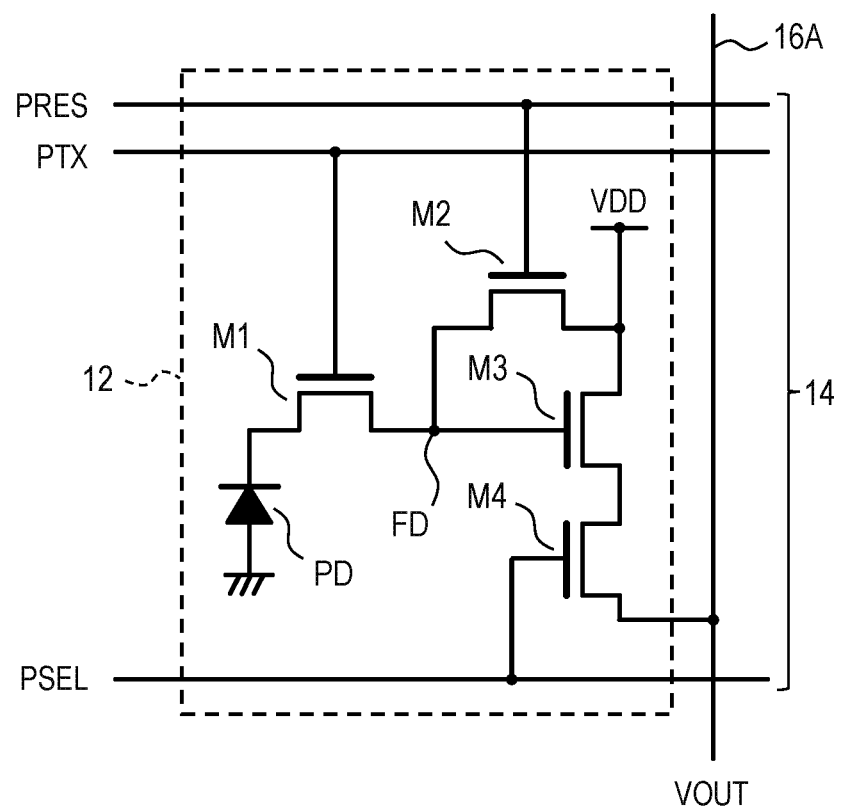
FIG. 2 is a circuit diagram illustrating a configuration example of a pixel in the photoelectric conversion device according to the first embodiment.
Figure 3:
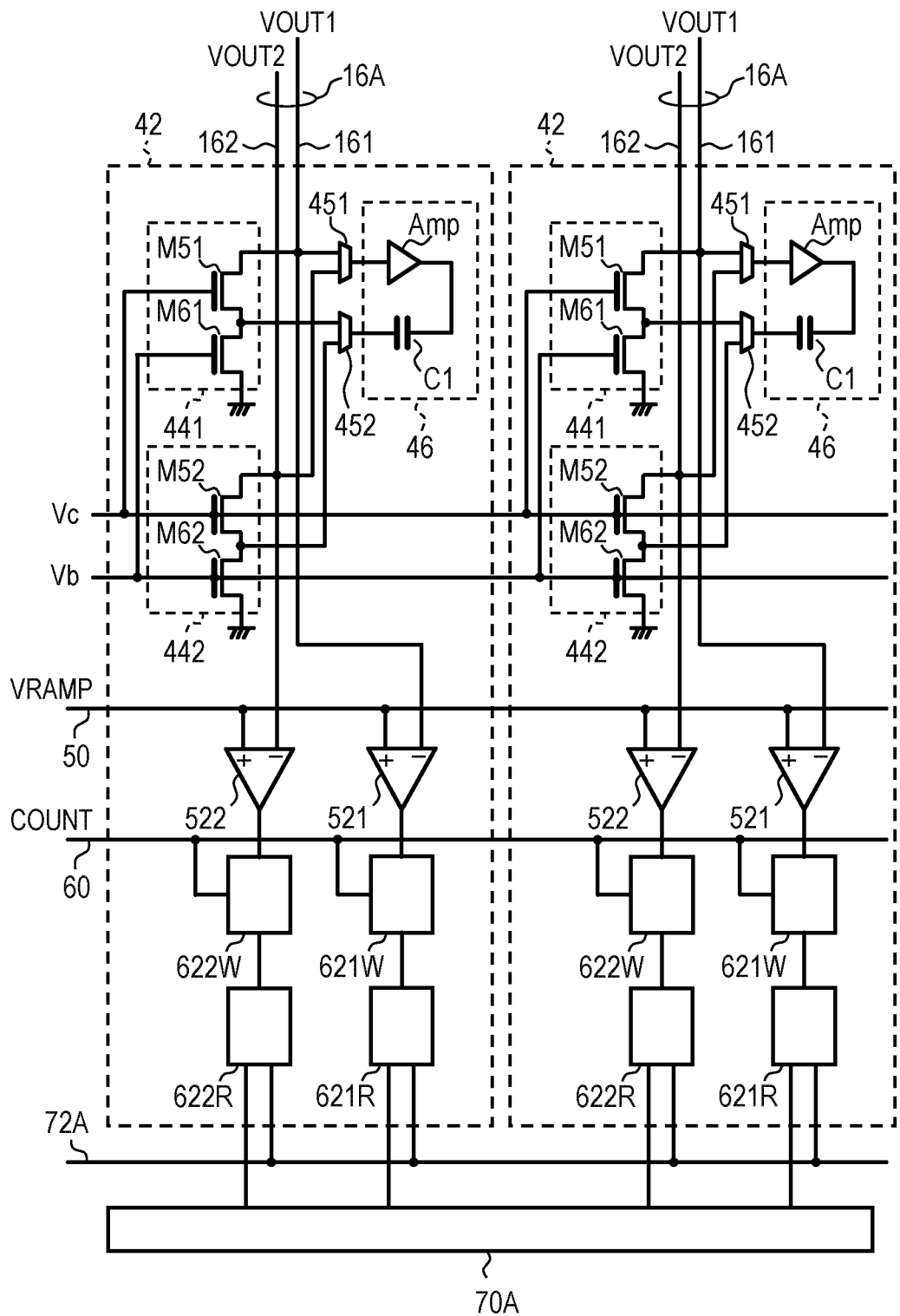
FIG. 3 is a circuit diagram illustrating a configuration example of a column circuit in the photoelectric conversion device according to the first embodiment.
Figure 4:
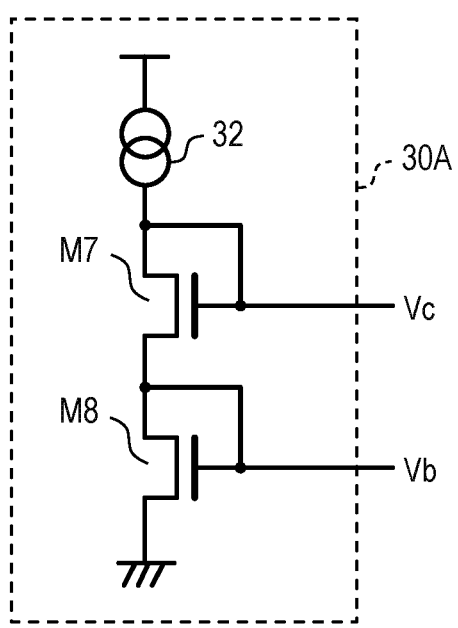
FIG. 4 is a circuit diagram illustrating a configuration example of a bias circuit in the photoelectric conversion device according to the first embodiment.
Figure 5:
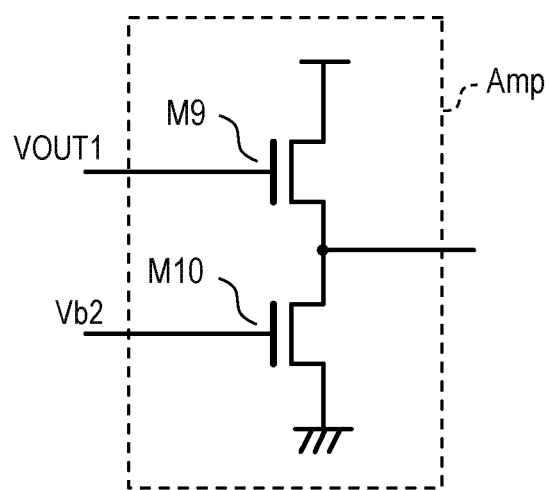
FIG. 5 is a circuit diagram illustrating a configuration example of an amplifier of a negative capacitance circuit in the photoelectric conversion device according to the first embodiment.
Figure 7:
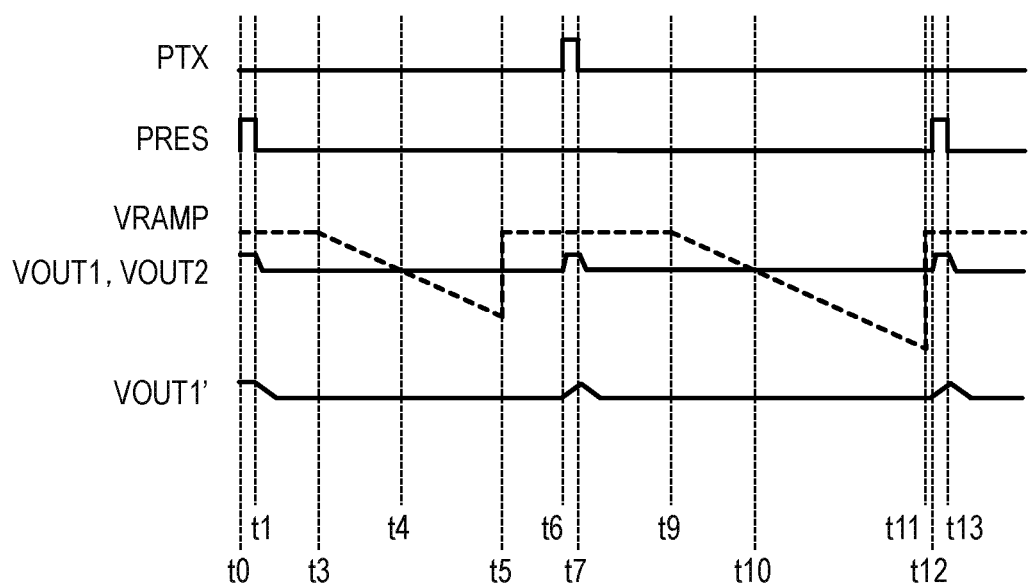
FIG. 7 is a timing chart illustrating a method of driving the photoelectric conversion device according to the first embodiment.

A photoelectric conversion device and a method of driving the same according to a first embodiment of the disclosure will be described with reference to FIG. 1 to FIG. 7. FIG. 1 is a block diagram illustrating a schematic configuration of a photoelectric conversion device according to the present embodiment. FIG. 2 is a circuit diagram illustrating a configuration example of a pixel in the photoelectric conversion device according to the present embodiment. FIG. 3 is a circuit diagram illustrating a configuration example of a column circuit in the photoelectric conversion device according to the present embodiment. FIG. 4 is a circuit diagram illustrating a configuration example of a bias circuit in the photoelectric conversion device according to the present embodiment. FIG. 5 is a circuit diagram illustrating a configuration example of an amplifier of the negative capacitance circuit in the photoelectric conversion device according to the present embodiment. FIG. 6A and FIG. 6B are schematic diagrams illustrating a configuration example of the photoelectric conversion device according to the present embodiment. FIG. 7 is a timing chart illustrating a method of driving the photoelectric conversion device according to the present embodiment.

As illustrated in FIG. 1, the photoelectric conversion device 100 according to the present embodiment includes a pixel array unit or circuit 10, a vertical scanning circuit 20, bias circuits 30A and 30B, readout circuits 40A and 40B, reference signal generation circuits 48A and 48B, and counter circuits 58A and 58B. The photoelectric conversion device 100 further includes horizontal scanning circuits 70A and 70B, output circuits 80A and 80B, and a control circuit 90.

The pixel array unit 10 is provided with a plurality of pixels 12 arranged in a matrix form over a plurality of rows and a plurality of columns. Each pixel 12 includes a photoelectric conversion unit or circuit including a photoelectric conversion element such as a photodiode, and outputs a pixel signal corresponding to an amount of incident light. The number of rows and columns of the pixel array arranged in the pixel array unit 10 is not particularly limited. In the pixel array unit 10, in addition to effective pixels which output pixel signals according to an amount of incident light, an optical black pixel in which the photoelectric conversion unit is shielded from light, a dummy pixel which does not output signals, and the like may be arranged. A specific configuration of the pixel 12 will be described later.

In each row of the pixel array unit 10, a control line 14 is arranged so as to extend in a first direction (a lateral direction in FIG. 1). Each of the control lines 14 is connected to each of the pixels 12 arranged in the first direction on the corresponding row, and serves as an output line common to these pixels 12. The first direction in which the control lines 14 extend may be referred to as a row direction or a horizontal direction. The control lines 14 are connected to the vertical scanning circuit 20. Each of the control lines 14 may include a plurality of signal lines.

In each column of the pixel array unit 10, an output line group 16A or an output line group 16B is disposed so as to extend in a second direction (vertical direction in FIG. 1) intersecting the first direction. The output line group 16A and the output line group 16B are alternately arranged in each column. For example, the output line group 16A is arranged in odd-numbered columns, and the output line group 16B is arranged in even-numbered columns. Each of the output line groups 16A and 16B includes a plurality of output lines. Each of the pixels 12 arranged in each column is connected to one of the plurality of output lines of the corresponding column. In the present embodiment, each of the output line groups 16A and 16B includes two output lines (output lines 161 and 162 described later). The output line groups 16A are connected to the readout circuit 40A. The output line groups 16B are connected to the readout circuit 40B.

The vertical scanning circuit 20 is a control circuit having a function of receiving control signals from the control circuit 90, generating control signals for driving the pixels 12, and outputting the generated control signals to the pixels 12 via the control lines 14. A logic circuit such as a shift register or an address decoder may be used for the vertical scanning circuit 20. The vertical scanning circuit 20 sequentially outputs control signals to the control lines 14 of each row, and sequentially drives the pixels 12 of the pixel array unit 10 in units of rows. A signal read out from each of the pixels 12 in units of rows is input to the readout circuit 40A or the readout circuit 40B via the output line group 16A or the output line group 16B arranged in each column of the pixel array unit 10.

The bias circuit 30A supplies a predetermined bias voltage to a current source (current source circuits 441 and 442 described later) (not illustrated) included in a column circuit 42 of each column of the readout circuit 40A. Similarly, the bias circuit 30B is a circuit that supplies a predetermined bias voltage to a current source (current source circuits 441 and 442) (not illustrated) included in a column circuit 42 of each column of the readout circuit 40B.

The readout circuit 40A includes a plurality of column circuits 42 corresponding to the number of columns in which the output line group 16A is arranged. Each of the column circuits 42 of the readout circuit 40A is connected to the output line group 16A of the corresponding column. Similarly, the readout circuit 40B includes a plurality of column circuits 42 corresponding to the number of columns in which the output line group 16B is arranged. Each of the column circuits 42 of the readout circuit 40B is connected to the output line group 16B of the corresponding column. The column circuit 42 is a processing circuit that performs predetermined processing on the pixel signal read out from the pixel 12 in the corresponding column. Examples of the processing performed by the column circuit 42 include amplification processing and signal processing such as analog-to-digital conversion (AD conversion). The column circuit 42 may include a signal holding circuit (memory) for holding the processed pixel signal.

The reference signal generation circuit 48A is connected to the readout circuit 40A. The reference signal generation circuit 48A has a function of receiving a control signal from the control circuit 90, generating a reference signal used for AD conversion, and outputting the generated reference signal to the readout circuit 40A. Similarly, the reference signal generation circuit 48B is connected to the readout circuit 40B. The reference signal generation circuit 48B has a function of receiving a control signal from the control circuit 90, generating a reference signal used for AD conversion, and outputting the generated reference signal to the readout circuit 40B.

The reference signal in the AD conversion may be a signal having a predetermined amplitude corresponding to a range of the pixel signal and whose signal level changes with time. The reference signal is not particularly limited, but, for example, a ramp signal whose signal level monotonically increases or monotonically decreases with lapse of time may be applied. The change of the signal level is not necessarily continuous, and may be in a step shape. The change in the signal level need not necessarily be linear with respect to time, but may be curvilinear with respect to time (e.g., sine wave or cosine wave).

The counter circuit 58A is connected to the readout circuit 40A. The counter circuit 58A performs a counting operation in response to a control signal from the control circuit 90, and outputs a count signal indicating the count value to the readout circuit 40A. The counter circuit 58A starts a counting operation in synchronization with a timing at which a change in the signal level of the reference signal supplied from the reference signal generation circuit 48A starts. Similarly, the counter circuit 58B is connected to the readout circuit 40B. The counter circuit 58B has a function of performing a counting operation in response to a control signal from the control circuit 90 and outputting a count signal indicating the count value to the readout circuit 40B. The counter circuit 58B starts a counting operation in synchronization with a timing at which a change in the signal level of the reference signal supplied from the reference signal generation circuit 48B starts.

The horizontal scanning circuit 70A is a control circuit having a function of receiving control signals from the control circuit 90, generating control signals for reading out the pixel signals from the column circuits 42 of the readout circuit 40A, and outputting the generated control signal to the readout circuit 40A. The horizontal scanning circuit 70A sequentially scans the column circuits 42 of the readout circuit 40A, and sequentially outputs the pixel signals held in the column circuits 42 to the output circuit 80A via a horizontal output line 72A. Similarly, the horizontal scanning circuit 70B is a control unit having a function of receiving control signals from the control circuit 90, generating control signals for reading out pixel signals from the column circuits 42 of the readout circuit 40B, and outputting the generated control signal to the readout circuit 40B. The horizontal scanning circuit 70B sequentially scans the column circuits 42 of the readout circuit 40B, and sequentially outputs the pixel signals held in the column circuits 42 to the output circuit 80B via a horizontal output line 72B. A logic circuit such as a shift register or an address decoder may be used for the horizontal scanning circuits 70A and 70B.

The output circuit 80A may be configured by a buffer amplifier, a differential amplifier, or the like, and is a processing circuit that performs predetermined signal processing on the pixel signal of the column selected by the horizontal scanning circuit 70A, and outputs the processed pixel data. Similarly, the output circuit 80B is a processing circuit may be configured by a buffer amplifier, a differential amplifier, or the like, and is a processing circuit that performs predetermined signal processing on the pixel signal of the columns selected by the horizontal scanning circuit 70B, and outputs the processed pixel data. Examples of the signal processing performed by the output circuits 80A and 80B include correction processing by correlated double sampling (CDS) and amplification processing.

The control circuit 90 generates control signals for controlling operations of the vertical scanning circuit 20, the readout circuits 40A and 40B, the reference signal generation circuits 48A and 48B, the counter circuits 58A and 58B, and the horizontal scanning circuits 70A and 70B, and outputting the generated control signals to these functional blocks. At least a part of the control signals for controlling the operation of these functional blocks may be supplied from the outside of the photoelectric conversion device 100.

FIG. 1 illustrates an example in which two readout circuit blocks are provided: a readout circuit block including a readout circuit 40A, a horizontal scanning circuit 70A, an output circuit 80A, and the like; and a readout circuit block including a readout circuit 40B, a horizontal scanning circuit 70B, an output circuit 80B, and the like. However, the number of readout circuit blocks is not necessarily two, but may be one.

As illustrated in, e.g., FIG. 2, each of the pixels 12 constituting the pixel array unit 10 may include a photoelectric conversion element PD, a transfer transistor M1, a reset transistor M2, an amplifier transistor M3, and a select transistor M4.

The photoelectric conversion element PD is, for example, a photodiode, and has an anode connected to a ground voltage line and a cathode connected to a source of the transfer transistor M1. A drain of the transfer transistor M1 is connected to a source of the reset transistor M2 and a gate of the amplifier transistor M3. A node FD to which the drain of the transfer transistor M1, the source of the reset transistor M2, and the gate of the amplifier transistor M3 are connected is a so-called floating diffusion. The floating diffusion includes a capacitance component (floating diffusion capacitance) and functions as a charge holding portion. The floating diffusion capacitance may include a gate capacitance of a transistor, a p-n junction capacitance, an interconnection capacitance, and the like. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the output line group 16A (or the output line group 16B).

In the case of the pixel configuration of FIG. 2, the control line 14 of each row includes three signal lines including a signal line connected to a gate of the transfer transistor M1, a signal line connected to a gate of the reset transistor M2, and a signal line connected to a gate of the select transistor M4. A control signal PTX is supplied from the vertical scanning circuit 20 to the gate of the transfer transistor M1. A control signal PRES is supplied from the vertical scanning circuit 20 to the gate of the reset transistor M2. A control signal PSEL is supplied from the vertical scanning circuit 20 to the gate of the select transistor M4. When each transistor is formed of an n-channel MOS transistor, when a high-level control signal is supplied from the vertical scanning circuit 20, the corresponding transistor is turned on. When a low-level control signal is supplied from the vertical scanning circuit 20, the corresponding transistor is turned off.

In the present embodiment, a description will be given assuming a case where electrons are used as a signal charge among electron-hole pairs generated in the photoelectric conversion element PD by light incidence. When electrons are used as the signal charge, each transistor included in the pixel 12 may be formed of an n-channel MOS transistor. However, the signal charge is not limited to electrons, and holes may be used as the signal charge. When holes are used as the signal charge, the conductivity type of each transistor is opposite to that described in the present embodiment. In addition, the term "source" or "drain" of the MOS transistor may vary depending on the conductivity type of the transistor or the target function. Some or all of names of the source and the drain used in the present embodiment are sometimes referred to as reverse names. In the present specification, one of the source and the drain may be referred to as a first main node, the other of the source and the drain may be referred to as a second main node, and the gate may be referred to as a control node.

The photoelectric conversion element PD converts (photoelectrically converts) incident light into charge of an amount corresponding to an amount of the incident light, and accumulates the generated charge. The transfer transistor M1 transfers charge held in the photoelectric conversion element PD to the node FD by turning on. The charge transferred from the photoelectric conversion element PD is held in the capacitance component (floating diffusion capacitance) of the node FD. As a result, the node FD becomes a potential corresponding to the amount of charge transferred from the photoelectric conversion element PD by the charge-voltage conversion by the floating diffusion capacitance.

The select transistor M4 connects the amplifier transistor M3 to the output line group 16A (or the output line group 16B) by turning on. The amplifier transistor M3 has a configuration in which a voltage VDD is supplied to the drain and a bias current is supplied from a current source (a current source circuit to be described later) (not illustrated) to the source via the select transistor M4, and constitutes an amplifier unit (a source follower circuit) having the gate as an input node. Accordingly, the amplifier transistor M3 outputs a signal based on the potential of the node FD to the output line group 16A (or the output line group 16B) via the select transistor M4. In this sense, the amplifier transistor M3 and the select transistor M4 are an output unit that outputs a pixel signal corresponding to the amount of charge held in the node FD.

The reset transistor M2 has a function of controlling supply of a voltage (voltage VDD) for resetting the node FD serving as a charge holding portion to the FD node. The reset transistor M2 resets the node FD to a voltage corresponding to the voltage VDD by turning on.

FIG. 3 illustrates two of the plurality of column circuits 42 constituting the readout circuit 40A. As illustrated in, e.g., FIG. 3, each of the column circuits 42 may include current source circuits 441 and 442, selection circuits 451 and 452, a negative capacitance circuit 46, comparison circuits 521 and 522, and a memory 621W, 621R, 622W and 622R.

The current source circuit 441 serves as a load current source of the amplifier transistor M3 of the pixel 12, and may include n-channel transistors M51 and M61, for example. The transistor M51 functions as a cascode transistor, and the transistor M61 functions as a current source transistor. A drain of the transistor M51 is connected to the output line 161. A source of the transistor M51 is connected to a drain of the transistor M61. A source of the transistor M61 is connected to the ground voltage line (fixed voltage node). A voltage Vc is supplied from the bias circuit 30A to a gate of the transistor M51. A voltage Vb is supplied from the bias circuit 30A to a gate of the transistor M61.

The current source circuit 442 serves as a load current source of the amplifier transistor M3 of the pixel 12, and may include n-channel transistors M52 and M62, for example. The transistor M52 functions as a cascode transistor, and the transistor M62 functions as a current source transistor. A drain of the transistor M52 is connected to the output line 162. A source of the transistor M52 is connected to a drain of the transistor M62. A source of the transistor M62 is connected to the ground voltage line (fixed voltage node). A voltage Vc is supplied from the bias circuit 30A to a gate of the transistor M52. A voltage Vb is supplied from the bias circuit 30A to a gate of the transistor M62.

As illustrated in, e.g., FIG. 4, the bias circuit 30A may include a current source 32 and n-channel transistors M7 and M8. One node of the current source 32 is connected to a power supply voltage line. The other node of the current source 32 is connected to a drain and a gate of the transistor M7. A source of the transistor M7 is connected to a drain and a gate of the transistor M8. A source of the transistor M8 is connected to the ground voltage line. A connection node between the drain and the gate of the transistor M7 serves as a node for supplying the voltage Vc, and a connection node between the drain and the gate of the transistor M8 serves as a node for supplying the voltage Vb. The voltages Vb and Vc are determined by a current value of the current source 32, and threshold voltages and sizes of the transistors M7 and M8.

The negative capacitance circuit 46 serves as a speed-up circuit that promotes, supports, advances, or assists a transitional change in potential of the output line group 16A, and may be configured to include, for example, an amplifier Amp and a capacitor C1. Output lines 161 and 162 are connected to an input node of the amplifier Amp via a selection circuit 451. The output node of the amplifier Amp is connected to one terminal of the capacitor C1. The other terminal of the capacitor C1 is connected to a connection node between the source of the transistor M51 and the drain of the transistor M61 and a connection node between the source of the transistor M52 and the drain of the transistor M62 via the selection circuit 452. The selection circuit 451 has a function of selecting one of the output line 161 and the output line 162 and connecting the selected one to the input node of the negative capacitance circuit 46. The selection circuit 452 has a function of connecting the output node of the negative capacitance circuit 46 to one of the current source circuit 441 and the current source circuit 442. More specifically, the selection circuit 452 connects the output node of the negative capacitance circuit 46 to the connection node between the source of the transistor M51 and the drain of the transistor M61 or the connection node between the source of the transistor M52 and the drain of the transistor M62. That is, the negative capacitance circuit 46 is configured to be connectable to one output line selected from the plurality of output lines constituting the output line group 16A and a current source circuit that supplies a current to the one output line. The selection circuits 451 and 452 may be controlled by, for example, a control signal from the control circuit 90.

As illustrated in, e.g., FIG. 5, the amplifier Amp may be configured by a source follower circuit including an n-channel transistor M9 and an n-channel transistor M10. In the circuit illustrated in FIG. 5, the transistor M9 is an input transistor, and the transistor M10 is a current source transistor. A drain of the transistor M9 is connected to a power supply voltage line, a source of the transistor M9 is connected to a drain of the transistor M10, and a source of the transistor M10 is connected to the ground voltage line. A voltage VOUT1 output from the pixel 12 to the output line 161 is supplied to a gate of the transistor M9. A bias voltage Vb2 is supplied to a gate of the transistor M10. An output node of the amplifier Amp, which is a connection node between the source of the transistor M9 and the drain of the transistor M10, is connected to one terminal of the capacitor C1. When the gain of the amplifier Amp is A and the capacitance value of the capacitor C1 is C, the negative capacitance circuit 46 contributes as a negative capacitance of $-A \times C$ under a certain condition.

The comparison circuit 521 includes two input nodes (a non-inverting input node (+) and an inverting input node (−)) to which two signals to be compared are input, and one output node to which a signal indicating a comparison result is output, and may be configured by, for example, a differential amplifier circuit. One input node (inverting input node) of the comparison circuit 521 is connected to the output line 161, and a voltage VOUT1 which is an output signal of the pixel 12 is input thereto via the output line 161. The other input node (non-inverting input node) of the comparison circuit 521 is connected to a reference signal line 50. A reference signal VRAMP is input from the reference signal generation circuit 48A to the other input node of the comparison circuit 521 via the reference signal line 50.

The memory 621W includes two input nodes and one output node. The memory 621R includes two input nodes and one output node. One input node of the memory 621W is connected to the output node of the comparison circuit 521. The other input node of the memory 621W is connected to a count signal line 60. A count signal COUNT is input from the counter circuit 58A to the other input node of the memory 621W via the count signal line 60. One input node of the memory 621R is connected to the output node of the memory 621W. The other input node of the memory 621R is connected to the horizontal scanning circuit 70A. The output node of the memory 621R is connected to the horizontal output line 72A.

The comparison circuit 521 compares the level of the voltage VOUT1 output from the output line 161 with the level of the reference signal VRAMP supplied from the reference signal line 50, and outputs a signal according to the comparison result. For example, the comparison circuit 521 outputs a high-level signal when the level of the reference signal VRAMP is lower than the level of the voltage VOUT1. The comparison circuit 521 outputs a low-level signal when the level of the reference signal VRAMP is higher than the level of the voltage VOUT1. The relationship between the magnitudes of the input signals and the level of the output signal may be reversed.

The memory 621W holds the count value indicated by the count signal COUNT supplied from the counter circuit 58A at a timing when the level of the output node of the comparison circuit 521 is inverted, as digital data of the pixel signal. The memory 621R holds digital data of the pixel signal transferred from the memory 621W. The digital data held in the memory 621R is sequentially transferred to the output circuit 80A via the horizontal output line 72A for each column according to the control signal supplied from the horizontal scanning circuit 70A. By providing the memory 621R after the memory 621W, the AD conversion operation may be performed in parallel with the transfer operation to the output circuit 80A.

Instead of providing the counter circuit 58A, the memory 621W of the column circuit 42 may have a function of a counter circuit. In this case, the memory 621W of the column circuit 42 of each column receives the common clock signal output from the control circuit 90 and counts pulses of the clock signal. The count value at the timing when the level of the output signal of the comparison circuit 521 is inverted becomes digital data held in the memory 621W.

The configuration and operation of the comparison circuit 522, the memory 622W, and the memory 622R are similar to those of the comparison circuit 521, the memory 621W, and the memory 621R except that one input node (inverting input node) of the comparison circuit 521 is connected to the output line 162. By providing the two output lines 161 and 162 in each column, signals of the pixels 12 of two rows may be read out at the same time.

Since the column circuit 42 of the readout circuit 40B is the same as the column circuit 42 of the readout circuit 40A except that the column circuit 42 of the readout circuit 40B is arranged in a column different from the column in which the column circuit 42 of the readout circuit 40A is arranged, description thereof is omitted. Hereinafter, the column circuit 42 of the readout circuit 40A will be described, but the same applies to the column circuit 42 of the readout circuit 40B. In the following description, when the output line groups 16A and 16B, the readout circuits 40A and 40B, and the like are described in common, the distinction between A and B is omitted, and the output line group 16A or 16B and the readout circuit 40A or 40B and the like may be referred to as the output line group 16 and the readout circuit 40 and the like. In the case where a plurality of similar components are provided, serial numbers such as 1, 2, 3, . . . may be added to the respective reference numerals to distinguish them from each other.

The photoelectric conversion device 100 according to the present embodiment may have a configuration in which all the functional blocks described above are arranged on one substrate, or may have a configuration in which the functional blocks are separately formed on each substrate as a stacked type in which a plurality of substrates are stacked.

FIG. 6A is a schematic diagram of a case where a pixel substrate 110 in which the pixel array unit 10 is disposed and a circuit substrate 120 in which other functional blocks are disposed are stacked. By disposing the pixel substrate 110 and the circuit substrate 120 on different substrates, the size of the photoelectric conversion device 100 may be reduced without sacrificing the area of the pixel array unit 10.

FIG. 6B is a schematic diagram of a case where a pixel substrate 110 in which the pixel array unit 10 is disposed and the circuit substrates 120 and 130 in which other functional blocks are disposed are stacked. Also in this case, the size of the photoelectric conversion device 100 may be reduced without sacrificing the area of the pixel array unit 10.

Note that the circuit elements constituting one functional block are not necessarily arranged on the same substrate, and may be arranged on different substrates.

Next, an operation of the photoelectric conversion device according to the present embodiment will be described with reference to FIG. 7. The timing chart of FIG. 7 illustrates waveforms of the control signals PTX and PRES, the reference signal VRAMP, the voltage VOUT1 of the output line 161, and the voltage VOUT2 of the output line 162. Here, it is assumed first that the output line 161 and the corresponding current source circuit 441 are selected by the selection circuits 451 and 452.

It is assumed that the control signal PSEL (not illustrated) of the row to be read out is at high-level immediately before time t0. As a result, the select transistor M4 of each of the pixels 12 belonging to the row is turned on, and each of the pixels 12 may output a pixel signal to the output line group 16A of the corresponding column. It is also assumed that, immediately before the time t0, the control signals PTX and PRES of the row to be read out are at low-level, and the reference signal VRAMP is a predetermined reference voltage.

During a period from the time t0 to time t1, the vertical scanning circuit 20 controls the control signal PRES of the row to be read out to high-level. Accordingly, the reset transistor M2 of each of the pixels 12 belonging to the row is turned on, and the node FD is reset to a voltage corresponding to the voltage VDD. A voltage VOUT1 corresponding to a reset voltage of the node FD (a pixel signal at a reset level of the pixel 12) is output to the output line 161 connected to the pixel 12 of the row to be read out.

When the control signal PRES is changed from low-level to high-level at the time t0, the voltage of the node FD is increased by capacitive coupling between the gate and the source of the reset transistor M2, and the voltage VOUT1 is also increased accordingly. When the control signal PRES changes from high-level to low-level at the time t1, the voltage of the node FD decreases due to the capacitive coupling between the gate and the source of the reset transistor M2, and accordingly, the voltage VOUT1 also decreases. The settling of the voltage VOUT1 accompanying the change in the gate voltage of the reset transistor M2 requires a certain time.

At a subsequent time t3, the reference signal generation circuit 48A starts a slope operation of gradually decreasing the voltage of the reference signal VRAMP with lapse of time. The counter circuit 58A starts counting up simultaneously with the start of the slope operation, and outputs a count signal COUNT indicating the count value to the column circuit 42 of each column via the count signal line 60.

The comparison circuit 521 of the column circuit 42 performs a comparison operation between the level of the voltage VOUT1 and the level of the reference signal VRAMP. The level of the output signal of the comparison circuit 521 is inverted at a timing when the magnitude relationship between the level of the voltage VOUT1 and the level of the reference signal VRAMP is changed, for example, at time t4 in FIG. 7.

The memory 621W of the column circuit 42 holds the count value indicated by the count signal COUNT output from the counter circuit 58A at the timing when the level of the output signal of the comparison circuit 521 is inverted, as digital data of the pixel signal of the reset level of the pixel 12. In this manner, the AD conversion of the pixel signal of the reset level of the pixel 12 is performed. The digital data held in the memory 621W is transferred to the memory 621R, and then transferred to the output circuit 80A in response to a control signal from the horizontal scanning circuit 70A.

At a subsequent time t5, the reference signal generation circuit 48A resets the reference signal VRAMP to a level of the reference voltage.

During a period from a subsequent time t6 to time t7, the vertical scanning circuit 20 controls the control signal PTX of the row to be read out to high-level. Thereby, the transfer transistor M1 of each of the pixels 12 belonging to the row is turned on, and the charge accumulated in the photoelectric conversion element PD during the predetermined exposure period is transferred to the node FD. Thereby, the voltage of the node FD decreases according to an amount of charge transferred from the photoelectric conversion element PD, and the voltage VOUT1 of the output line 161 also decreases. A voltage VOUT1 corresponding to the voltage of the node FD (a pixel signal of the light signal level of the pixel 12) is output to the output line 161. It is to be noted that FIG. 7 illustrates a waveform corresponding to dark, and it is assumed that the signal level is settled to substantially the same level as the reset level at the time t3 also at the time t7 and thereafter.

When the control signal PTX is changed from low-level to high-level at the time t6, the voltage of the node FD is increased by the capacitive coupling between the gate and the drain of the transfer transistor M1, and the voltage VOUT1 is also increased accordingly. When the control signal PTX changes from high-level to low-level at the time t7, the voltage of the node FD decreases due to the capacitive coupling between the gate and the drain of the transfer transistor M1, and the voltage VOUT1 also decreases accordingly. The settling of the voltage VOUT1 accompanying the change in the gate voltage of the transfer transistor M1 requires a certain time.

At a subsequent time t9, the reference signal generation circuit 48A starts a slope operation in which the voltage of the reference signal VRAMP changes with lapse of time. The counter circuit 58A starts counting up simultaneously with the start of the slope operation, and outputs a count signal COUNT indicating the count value to the column circuit 42 of each column via the count signal line 60.

The comparison circuit 521 of the column circuit 42 performs a comparison operation between the level of the voltage VOUT1 and the level of the reference signal VRAMP. The level of the output signal of the comparison circuit 521 is inverted at a timing when the magnitude relationship between the level of the voltage VOUT1 and the level of the reference signal VRAMP is changed, for example, at time t10 in FIG. 7. The memory 621W of the column circuit 42 holds the count value indicated by the count signal COUNT output from the counter circuit 58A at the timing when the level of the output signal of the comparison circuit 521 is inverted, as digital data of the pixel signal of the light signal level of the pixel 12. In this manner, the AD conversion of the pixel signal of the light signal level of the pixel 12 is performed. The digital data held in the memory 621W is transferred to the memory 621R, and then transferred to the output circuit 80A in response to a control signal from the horizontal scanning circuit 70A.

The digital data of the pixel signal acquired in this manner is subjected to correction processing by digital CDS (Correlated Double Sampling) in the output circuit 80A of the subsequent stage. In the correction processing by the digital CDS, the digital data of the pixel signal of the reset level is subtracted from the digital data of the pixel signal of the light signal level, and the noise component superimposed on the pixel signal of the light signal level is removed.

As described above, due to the influence of the parasitic capacitance accompanying the output line 161, a certain time is required for the settling of the voltage VOUT1 of the output line 161 accompanying the potential change of the control signals PRES and PTX. However, in the photoelectric conversion device according to the present embodiment, either one of the output line 161 and the output line 162 is selected so that the negative capacitance circuit 46 may be connected. When the gain of the amplifier Amp is A and the capacitance value of the capacitor C1 is C, the negative capacitance circuit 46 contributes as a negative capacitance of $-A \times C$ under a certain condition. Therefore, by connecting the negative capacitance circuit 46 to the output line 161, it is possible to effectively reduce the capacitance accompanying the output line 161.

In FIG. 7, the voltage of the output line 161 when the column circuit 42 does not have the negative capacitance circuit 46 is added as a voltage VOUT1'. As is apparent from comparison between the waveform of the voltage VOUT1 and the waveform of the voltage VOUT1', by connecting the negative capacitance circuit 46 to the output line 161, it is possible to shorten the settling time of the potential of the output line 161.

When the capacitance value of the parasitic capacitance accompanying the output line 161 is CVL and the gain A of the amplifier Amp is 1, the capacitance value of the capacitor C1 of the negative capacitance circuit 46 may be set to, for example, CVL. In this case, the value of the negative capacitance of the negative capacitance circuit 46 becomes -CVL, and the parasitic capacitance accompanying the output line 161 may be cancelled. However, the capacitance value of the capacitor C1 may be set in a range greater than 0 and less than CVL in view of an increase in the chip size due to the size of the capacitor C1. Also in this case, the effect of shortening the settling time of the potential by the negative capacitance circuit 46 may be obtained.

Note that although the readout operation from the pixel 12 connected to the output line 161 is described here, the readout operation from the pixel 12 connected to the output line 162 may be performed at the same timing as the readout operation from the pixel 12 connected to the output line 161. In this case, also in the output line 162, similarly to the voltage VOUT1 in the output line 161, a constant time is required for the settling of the voltage VOUT2 due to the influence of capacitive coupling between the gates of the transfer transistor M1 and the reset transistor M2 and the node FD.

In the configuration of the present embodiment, assuming that the parasitic capacitance accompanying the output line 161 and the parasitic capacitance accompanying the output line 162 are the same, there may be a difference in settling time between the output line 161 and the output line 162 depending on the presence or absence of the negative capacitance circuit 46. However, it is generally difficult to completely equalize the parasitic capacitance associated with the output line 161 and the parasitic capacitance associated with the output line 162, and the time required for settling may vary between the output lines 161 and 162.

In such a case, the capacitance value of the negative capacitance circuit 46 may be set according to the capacitance difference between the parasitic capacitance accompanying the output line 161 and the parasitic capacitance accompanying the output line 162. By connecting the negative capacitance circuit 46 to the output line having a larger parasitic capacitance, i.e., the output line 161 in the above example, it is possible to effectively reduce the capacitance attached to the output line 161 and shorten the difference in the settling time between the output lines 161 and 162. For example, when the parasitic capacitance associated with the output line 162 is CVL, the parasitic capacitance associated with the output line 161 is CVL+ΔC, and the gain A of the amplifier Amp is 1, the parasitic capacitance difference between the output lines 161 and 162 may be canceled by setting the capacitance value of the capacitor C1 to ΔC. As a result, the voltage VOUT1 of the output line 161 and the voltage VOUT2 of the output line 162 have substantially the same waveform as illustrated in FIG. 7, for example, so that the characteristic difference caused by the output lines 161 and 162 from which signals are read out may be reduced, and image quality degradation may be suppressed. When the capacitance value of at least the capacitor C1 is set in a range greater than 0 and less than 2ΔC, the parasitic capacitance difference between the output lines 161 and 162 may be made smaller than ΔC, and the effect of reducing the parasitic capacitance difference may be obtained. Although the optimum value of the capacitor C1 is ΔC, it can be said that a range obtained by adding the manufacturing variation of the capacitor to ΔC is the optimum range of the capacitor C1 in consideration of the manufacturing variation of the capacitor. For example, when the manufacturing variation of the capacitance is ±20%, the capacitor C1 is desirably set in the range of ΔC±20%.

Further, in the photoelectric conversion device, a signal may be read out using only a part of output lines among a plurality of output lines constituting the output line group 16 of each column. For example, in the case where the pixels 12 connected to the output line 161 and the pixels 12 connected to the output line 162 are alternately arranged in the column direction as in the present embodiment, signals may be read out every other row. In this case, one of the output lines 161 and 162 is used for reading out the signal, but the other is not used for reading out the signal.

When the photoelectric conversion device is driven in this manner, it is preferable that the selection circuits 451 and 452 select an output line having a small parasitic capacitance among a plurality of output lines constituting the output line group 16, connect the negative capacitance circuit 46, and use the output line for reading out the signal.

In the case of the above example, the output line 162 and the corresponding current source circuit 442 are selected by the selection circuits 451 and 452, and the negative capacitance circuit 46 is connected to these circuits, and the output line 162 is used for reading out the signal. For example, when the parasitic capacitance accompanying the output line 162 is CVL, the gain A of the amplifier Amp is 1, and the capacitance value of the capacitor C1 is ΔC, the parasitic capacitance accompanying the output line 162 may be effectively reduced to CVL−ΔC.

By driving the photoelectric conversion device in this manner, the parasitic capacitance accompanying the output line 162 may be greatly reduced, the settling time of the potential of the output line 162 may be shortened, and the speed of the signal readout operation may be increased.

As described above, according to the present embodiment, in the photoelectric conversion device in which the output line group arranged in each column includes a plurality of output lines, influence of parasitic capacitance accompanying the output lines may be reduced, and degradation of image quality may be suppressed.

Second Embodiment

Figure 8:
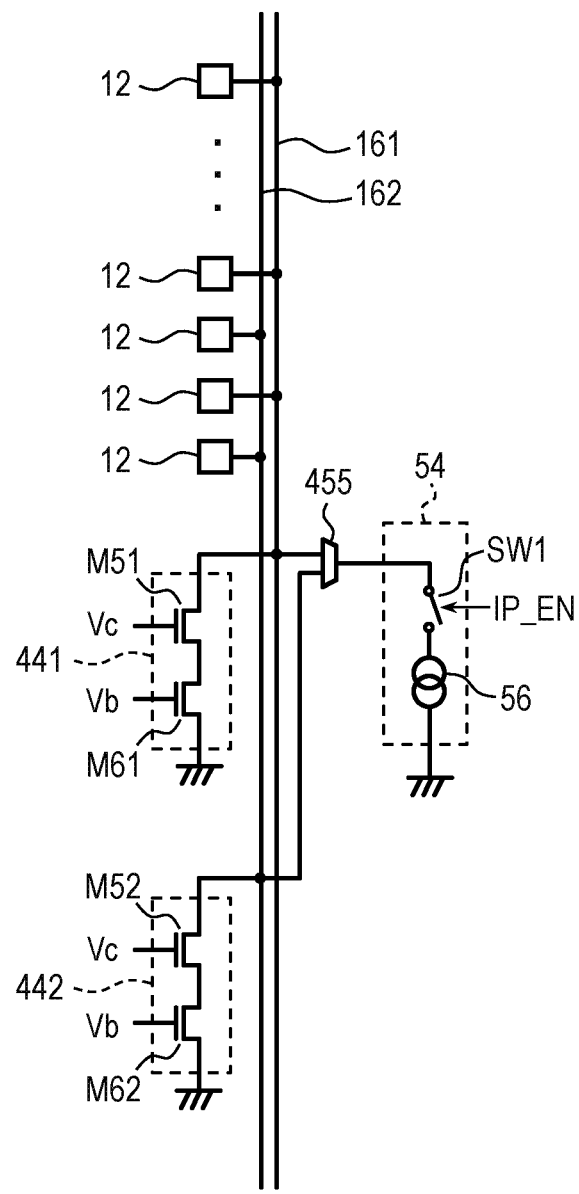
FIG. 8 is a circuit diagram illustrating a configuration example of a photoelectric conversion device according to a second embodiment.
Figure 9:
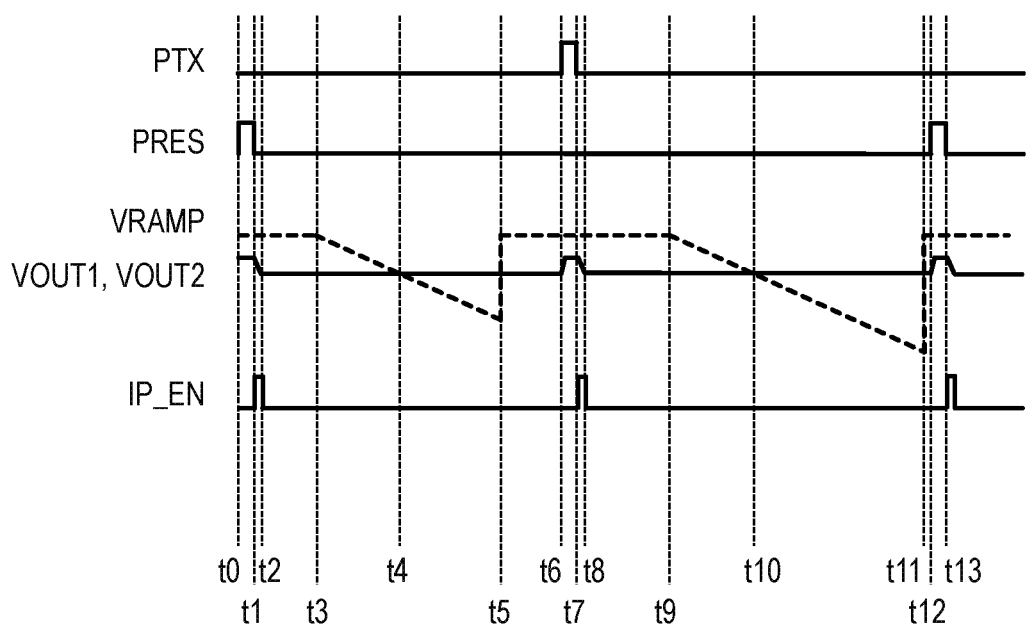
FIG. 9 is a timing chart illustrating a method of driving the photoelectric conversion device according to the second embodiment.

A photoelectric conversion device and a method of driving the same according to a second embodiment will be described with reference to FIG. 8 and FIG. 9. Components similar to those of the photoelectric conversion device according to the first embodiment are denoted by the same reference numerals, and description thereof will be omitted or simplified. FIG. 8 is a circuit diagram illustrating a configuration example of the photoelectric conversion device according to the present embodiment. FIG. 9 is a timing chart illustrating a method of driving the photoelectric conversion device according to the present embodiment.

The photoelectric conversion device according to the present embodiment is different from the photoelectric conversion device according to the first embodiment in that the column circuit 42 includes a pulse current source circuit 54 instead of the negative capacitance circuit 46. Other points of the photoelectric conversion device according to the present embodiment are the same as those of the photoelectric conversion device according to the first embodiment.

As illustrated in, e.g., FIG. 8, the column circuit 42 of the photoelectric conversion device according to the present embodiment includes a pulse current source circuit 54 connected to the output line 161 and the output line 162 via a selection circuit 455. The pulse current source circuit 54 may include a current source 56 and a switch SW1. One terminal of the switch SW1 is connected to an input node of the selection circuit 455. The other terminal of the switch SW1 is connected to one terminal of the current source 56. The other terminal of the current source 56 is connected to the ground voltage line (fixed voltage node). Two output nodes of the selection circuit 455 are connected to an output line 161 and an output line 162. The switch SW1 is controlled by a control signal IP_EN. The switch SW1 is turned on (conductive state) when the control signal IP_EN is at high-level, and turned off (nonconductive state) when the control signal IP_EN is at low-level. The selection circuit 455 is configured to connect the pulse current source circuit 54 to one of the output line 161 and the output line 162. Similarly to the negative capacitance circuit 46 of the first embodiment, the pulse current source circuit 54 serves as a speed-up circuit that promotes a transitional change in potential at the output lines 161 and 162.

Next, an operation of the photoelectric conversion device according to the present embodiment will be described with reference to FIG. 9. The timing chart of FIG. 9 illustrates waveforms of the control signals PTX, PRES and IP_EN, the reference signal VRAMP, the voltage VOUT1 of the output line 161, and the voltage VOUT2 of the output line 162. Here, it is assumed that the output line 161 is selected by the selection circuit 455.

In the present embodiment, the control signal IP_EN is controlled to high-level at a timing when the potential of the output line 161 decreases due to coupling with the control line 14, and the switch SW1 is turned on. Specifically, the control signal IP_EN is controlled to high-level during a period from the time t1 at which the control signal PRES transits from high-level to low-level to time t2. Further, during a period from the time t7 at which the control signal PTX transits from high-level to low-level to time t8, the control signal IP_EN is controlled to high-level.

By turning on the switch SW1, the current source circuit 441 and the current source 56 are temporarily connected in parallel to the output line 161, and the current flowing through the output line 161 increases. This makes it possible to shorten the settling time of the voltage VOUT1 of the output line 161. The same applies to the behavior of the voltage VOUT2 when the pulse current source circuit 54 is connected to the output line 162. Therefore, in the various operation modes described in the first embodiment, the speed of the signal readout operation may be increased.

As described above, according to the present embodiment, in the photoelectric conversion device in which the output line group arranged in each column includes a plurality of output lines, influence of parasitic capacitance accompanying the output lines may be reduced, and degradation of image quality may be suppressed or image quality may improve.

Third Embodiment

Figure 10:
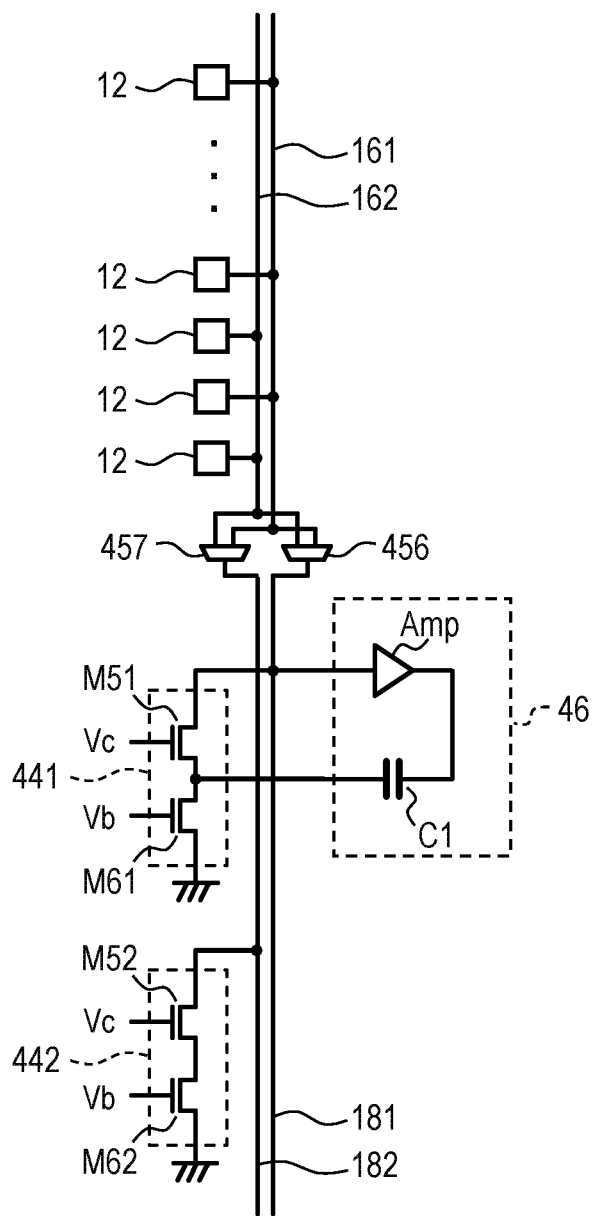
FIG. 10 is a circuit diagram illustrating a configuration example of a photoelectric conversion device according to a third embodiment.
Figure 11:
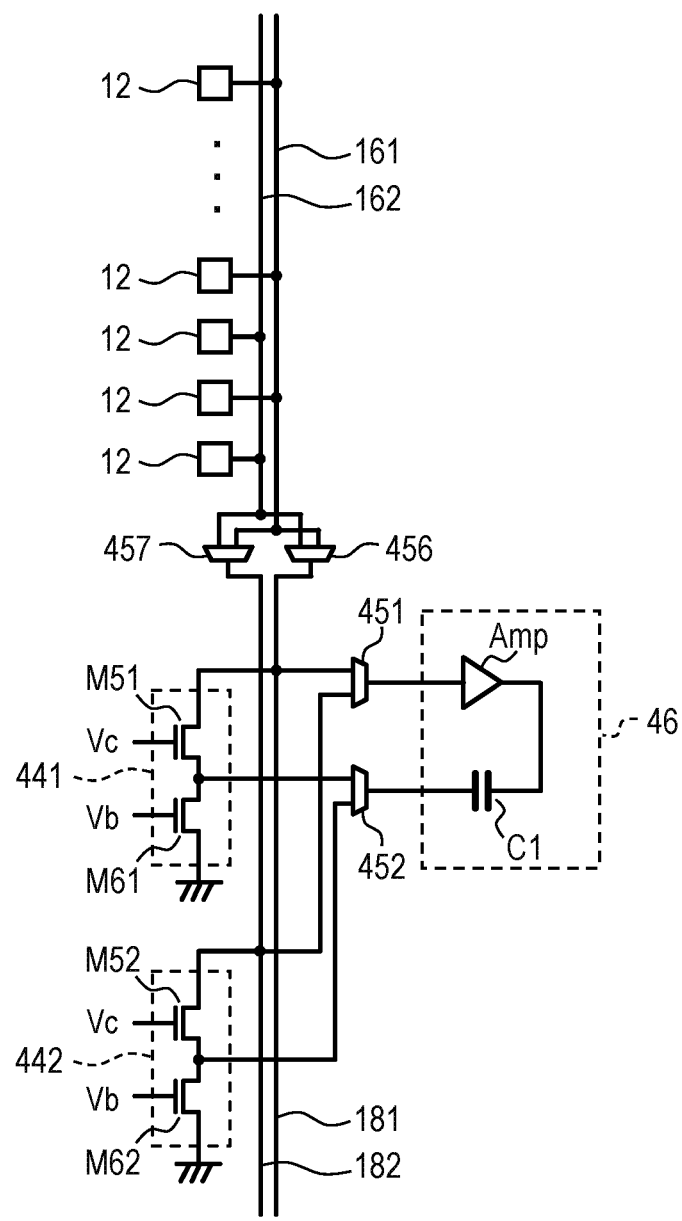
FIG. 11 is a circuit diagram illustrating another configuration example of the photoelectric conversion device according to the third embodiment.

A photoelectric conversion device according to a third embodiment will be described with reference to FIG. 10 and FIG. 11. Components similar to those of the photoelectric conversion device according to the first or second embodiment are denoted by the same reference numerals, and description thereof will be omitted or simplified. FIG. 10 is a circuit diagram illustrating a configuration example of the photoelectric conversion device according to the present embodiment. FIG. 11 is a circuit diagram illustrating another configuration example of the photoelectric conversion device according to the present embodiment.

As illustrated in FIG. 10, the photoelectric conversion device according to the present embodiment includes selection circuits 456 and 457 instead of the selection circuits 451 and 452 in the first embodiment. The current source circuit 441 is connected to the output line 181, the current source circuit 442 is connected to the output line 182, and the negative capacitance circuit 46 is connected to the output line 181 and the current source circuit 441. The output line 181 is connected to the output line 161 and the output line 162 via the selection circuit 456, and the output line 182 is connected to the output line 161 and the output line 162 via the selection circuit 457. That is, in the present embodiment, the selection circuits 456 and 457 are used instead of the selection circuits 451 and 452, and the output lines 161 and 162 connecting the negative capacitance circuit 46 are selected.

By selecting the output line 161 by the selection circuit 456, the output line 161 may be connected to the current source circuit 441 and the negative capacitance circuit 46 via the selection circuit 456 and the output line 181. By selecting the output line 162 by the selection circuit 457, the output line 162 may be connected to the current source circuit 442 via the selection circuit 457 and the output line 182. Alternatively, by selecting the output line 161 by the selection circuit 457, the output line 161 may be connected to the current source circuit 442 via the selection circuit 457 and the output line 182. By selecting the output line 162 by the selection circuit 456, the output line 162 may be connected to the current source circuit 441 and the negative capacitance circuit 46 via the selection circuit 456 and the output line 181.

Thus, also in the photoelectric conversion device of the present embodiment, the negative capacitance circuit 46 may be connected to an arbitrary output line among a plurality of output lines constituting the output line group 16. This makes it possible to speed up the signal readout operation in the various operation modes described in the first embodiment.

Further, in the photoelectric conversion device according to the present embodiment, since the negative capacitance circuit 46 is always connected to the output line 181 and the current source circuit 441, the current source circuit 441 is used both in the case of reading out only the signal of the output line 161 and in the case of reading out only the signal of the output line 162. On the other hand, in the photoelectric conversion device according to the first embodiment, the current source circuit 441 is used for reading out only the signal of the output line 161, and the current source circuit 442 is used for reading out only the signal of the output line 162. Therefore, in the photoelectric conversion device according to the present embodiment, unlike the first embodiment, it is possible to unify the operation in a mode in which only the signal of the output line 161 is read out and a mode in which only the signal of the output line 162 is read out.

However, in the circuit configuration of FIG. 10, when the operation mode in which only one of the signals of the output lines 161 and 162 is read out but the negative capacitance circuit 46 is set to the power-off state without using the negative capacitance circuit 46 is executed, the current source circuit 442 is used. In such a case, in order to read out a signal using the common current source circuit 441, for example, as illustrated in FIG. 11, selection circuits 451 and 452 described in the first embodiment may be further added.

In the circuit configuration illustrated in FIG. 11, when the negative capacitance circuit 46 is not used and only the signal of the output line 161 is read out by using the current source circuit 441, the output line 161 may be connected to the output line 181, and the negative capacitance circuit 46 may be connected to the output line 182 by using the selection circuits 451 and 452. When the negative capacitance circuit 46 is not used and only the signal of the output line 162 is read out by using the current source circuit 441, the output line 162 may be connected to the output line 181, and the negative capacitance circuit 46 may be connected to the output line 182 by using the selection circuits 451 and 452.

As described above, according to the present embodiment, in the photoelectric conversion device in which the output line group arranged in each column includes a plurality of output lines, influence of parasitic capacitance accompanying the output lines may be reduced, and degradation of image quality may be suppressed.

Fourth Embodiment

Figure 12:
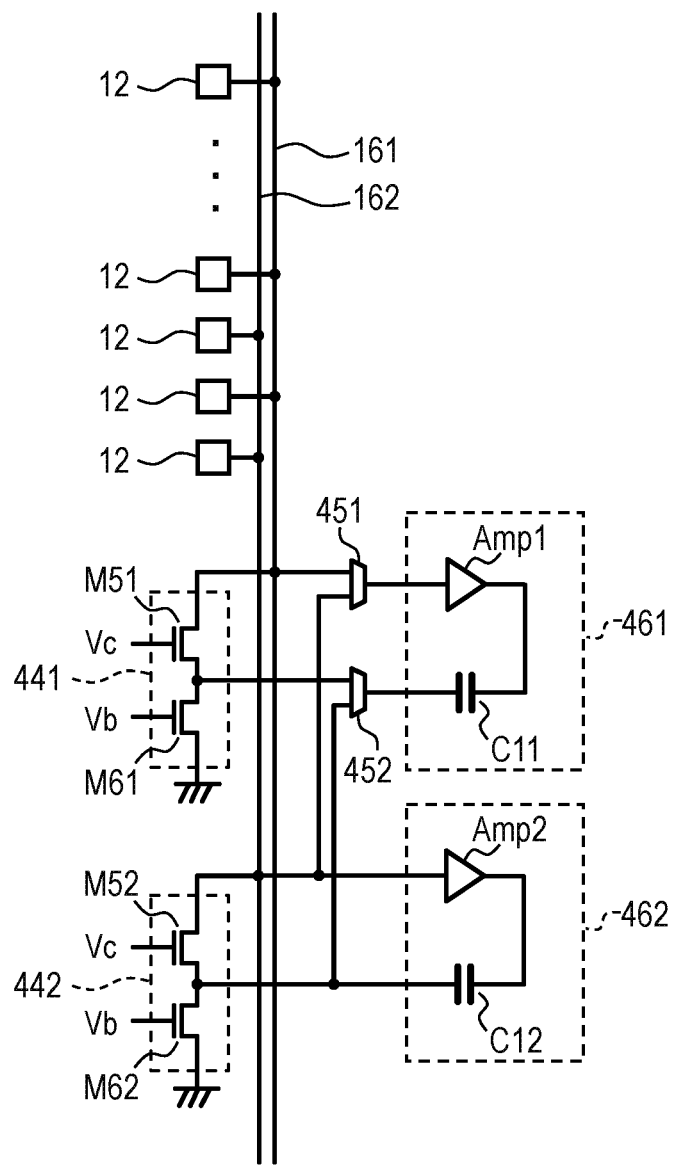
FIG. 12 is a circuit diagram illustrating a configuration example of a photoelectric conversion device according to a fourth embodiment.
Figure 13:
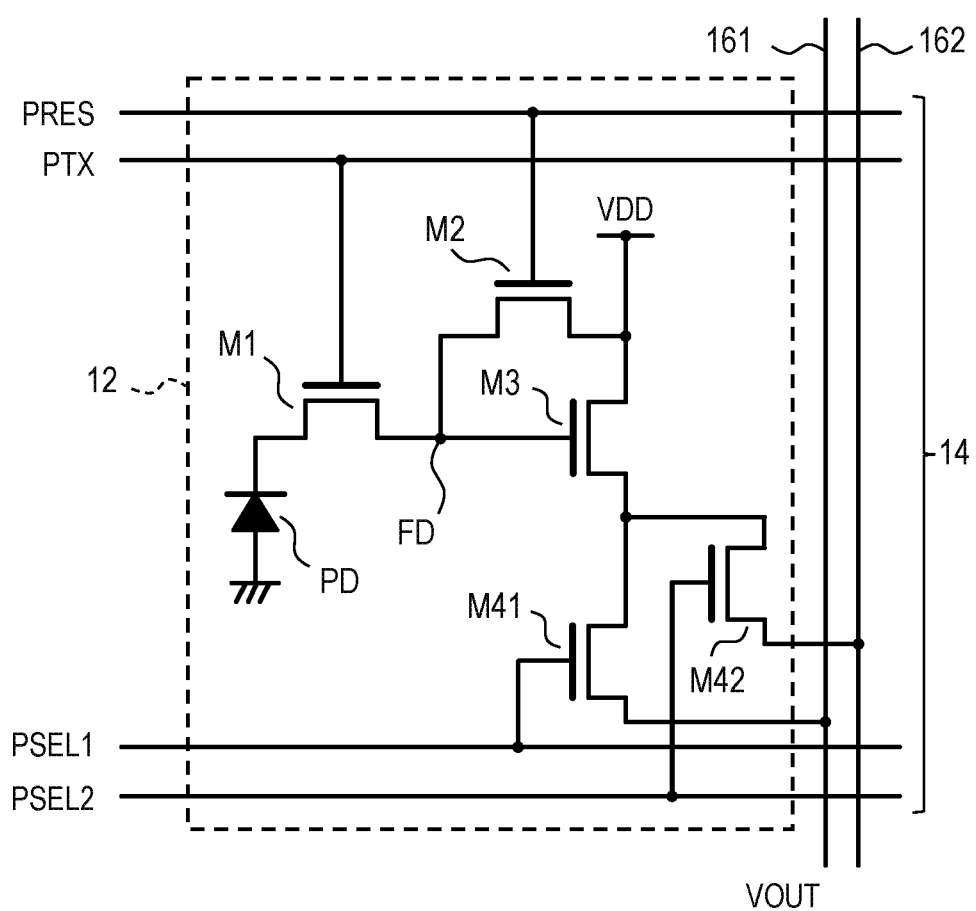
FIG. 13 is a circuit diagram illustrating another configuration example of a pixel in the photoelectric conversion device according to the fourth embodiment.
Figure 14:
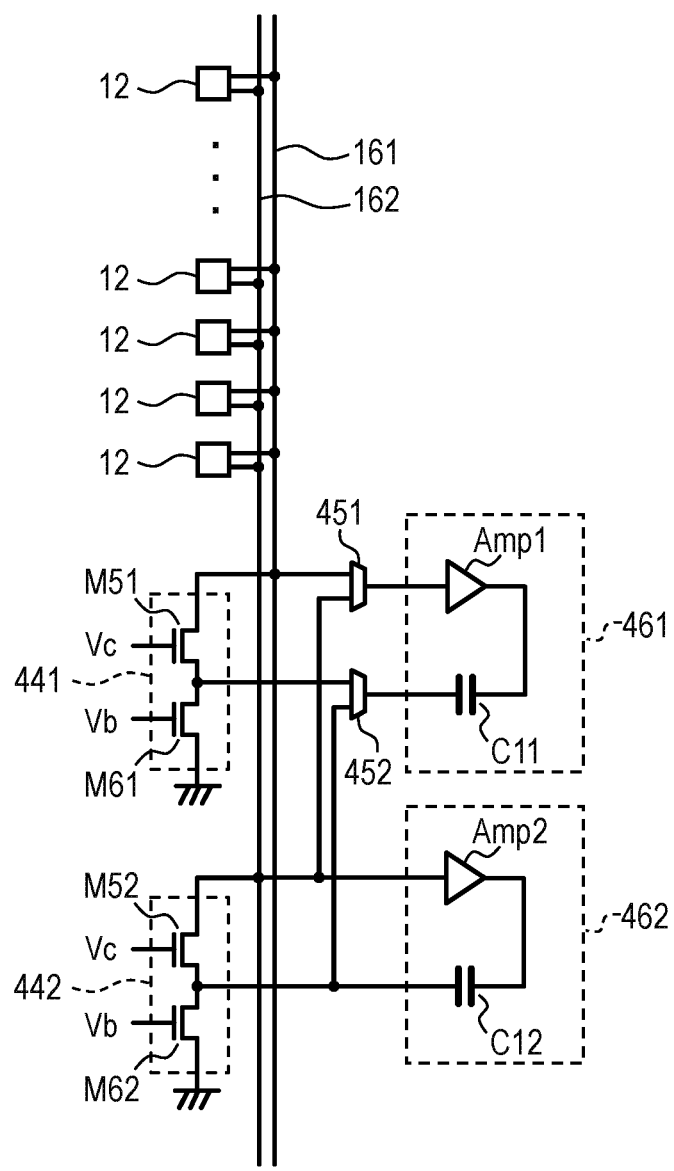
FIG. 14 is a circuit diagram illustrating another configuration example of the photoelectric conversion device according to the fourth embodiment.

A photoelectric conversion device according to a fourth embodiment will be described with reference to FIG. 12 to FIG. 14. Components similar to those of the photoelectric conversion devices according to the first to third embodiments are denoted by the same reference numerals, and description thereof will be omitted or simplified. FIG. 12 is a circuit diagram illustrating a configuration example of the photoelectric conversion device according to the present embodiment. FIG. 13 is a circuit diagram illustrating another configuration example of the pixel in the photoelectric conversion device according to the present embodiment. FIG. 14 is a circuit diagram illustrating another configuration example of the photoelectric conversion device according to the present embodiment.

As illustrated in FIG. 12, the photoelectric conversion device according to the present embodiment further includes a negative capacitance circuit 462 connected to the output line 162 and the current source circuit 442 in comparison with the column circuit 42 of the first embodiment. That is, the photoelectric conversion device according to the present embodiment can take a mode in which only the negative capacitance circuit 462 is connected to the output line 162, and a mode in which both of the negative capacitance circuits 461 and 462 are connected to the output line 162. The former mode may be used to read out both the signal of the output line 161 and the signal of the output line 162, and the latter mode may be used to read out only the signal of the output line 162.

When only the signal of the output line 162 is read out, the selection circuits 451 and 452 select the output line 162 and the current source circuit 442. Thereby, the two negative capacitance circuits 461 and 462 are connected to the output line 162 and the current source circuit 442, and the speed of the signal readout operation of the output line 162 may be further increased.

When both the signal of the output line 161 and the signal of the output line 162 are read out, the selection circuits 451 and 452 select the output line 161 and the current source circuit 441. Thus, the negative capacitance circuit 461 is connected to the output line 161 and the current source circuit 441, and the negative capacitance circuit 462 is connected to the output line 162 and the current source circuit 442.

In addition, in addition to connecting the negative capacitance circuit 461 to the output line 161, connecting the negative capacitance circuit 462 to the output line 162 also has an effect of reducing the difference between the lower limits of the dynamic ranges of the output lines 161 and 162 and further suppressing deterioration of image quality. In the first embodiment, as illustrated in FIG. 3, the amplifier Amp is connected only to the output line 161. In order for the amplifier Amp to operate normally, in the circuit of, e.g., FIG. 5, it is necessary to apply a constant drain-source voltage Vds to the transistor M10 and a constant gate-source voltage Vgs to the transistor M9. When the voltage of the output line 161 decreases and falls below Vds+Vgs, the amplifier Amp fails to operate normally. As a result, the lower limit of the dynamic range of the output line 161 is limited, and the dynamic range of the output line 161 may be different from the dynamic range of the output line 162. This may cause a difference in characteristics of signals read out from the output lines 161 and 162 at the time of high luminance, which may cause deterioration of image quality. In this regard, in the present embodiment, since the negative capacitance circuits 461 and 462 (amplifiers Amp1 and Amp2) are connected to the output lines 161 and 162, respectively, the difference in the lower limit of the dynamic range of the output lines 161 and 162 may be reduced.

FIG. 13 illustrates another configuration example of the pixel 12. The pixel 12 of FIG. 13 includes two select transistors M41 and M42 connected to the source of the amplifier transistor M3. The source of the select transistor M41 is connected to the output line 161, and the source of the select transistor M42 is connected to the output line 162. FIG. 14 illustrates a configuration example of the column circuit 42 when the pixel 12 illustrated in FIG. 13 is used.

According to the pixel configuration of FIG. 13, all the pixels 12 may output pixel signals to both of the output lines 161 and 162. Thus, even when only one of the output lines 161 and 162 is used for outputting signals, pixel signals of all the rows may be read out.

As described above, according to the present embodiment, in the photoelectric conversion device in which the output line group arranged in each column includes a plurality of output lines, influence of parasitic capacitance accompanying the output lines may be reduced, and degradation of image quality may be suppressed.

Fifth Embodiment

Figure 15:
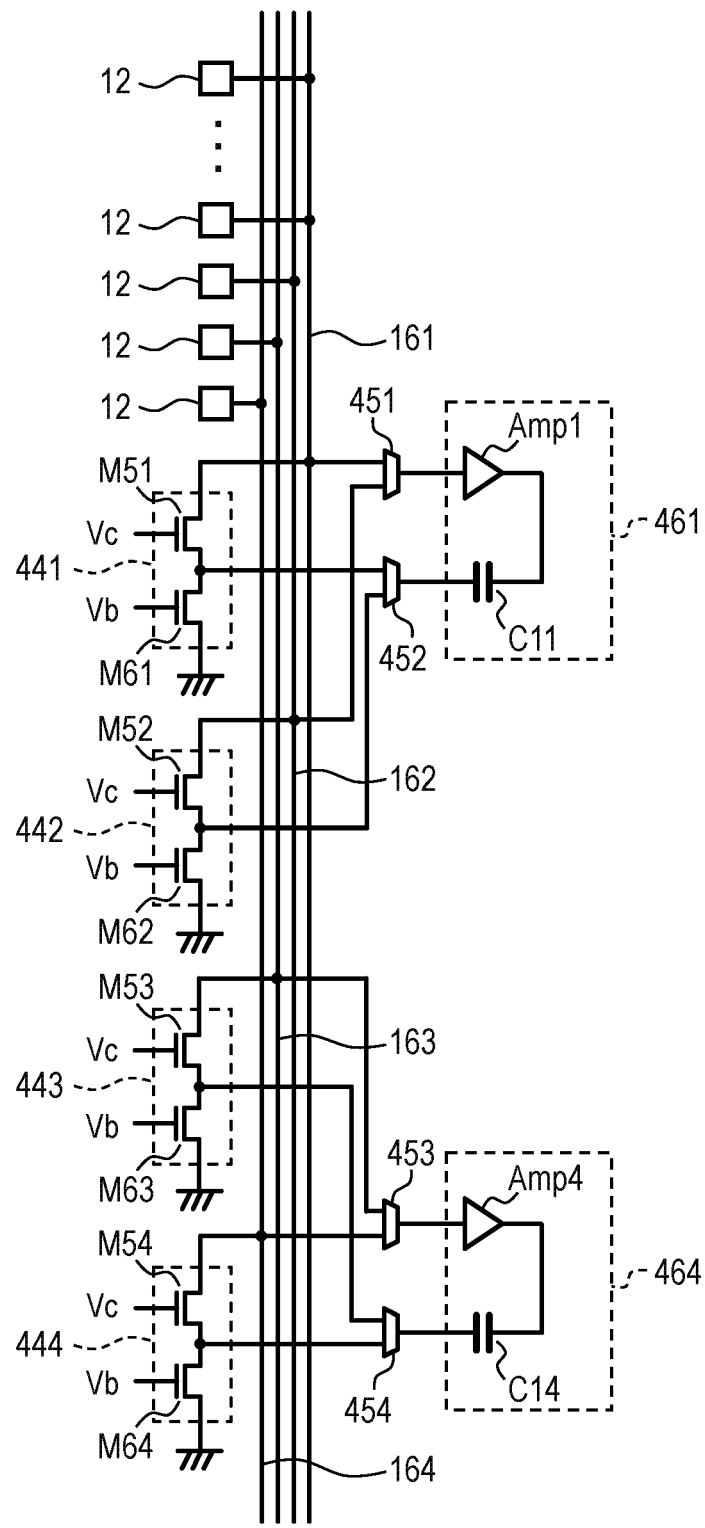
FIG. 15 is a circuit diagram illustrating a configuration example of a photoelectric conversion device according to a fifth embodiment.

A photoelectric conversion device according to a fifth embodiment will be described with reference to FIG. 15. Components similar to those of the photoelectric conversion devices according to the first to fourth embodiments are denoted by the same reference numerals, and description thereof will be omitted or simplified. FIG. 15 is a circuit diagram illustrating a configuration example of the photoelectric conversion device according to the present embodiment.

As illustrated in FIG. 15, the photoelectric conversion device according to the present embodiment includes four output lines 161, 162, 163 and 164 forming an output line group 16 in each column of the pixel array unit 10, and is configured to be able to simultaneously read out signals of the pixels 12 of four rows. Current source circuits 441, 442, 443 and 444 are connected to the output lines 161, 162, 163 and 164, respectively. A negative capacitance circuit 461 is connected to the output line 161 and the current source circuit 441, and to the output line 162 and the current source circuit 442 via selection circuits 451 and 452. A negative capacitance circuit 464 is connected to the output line 163 and the current source circuit 443, and to the output line 164 and the current source circuit 444 via selection circuits 453 and 454.

Thus, the negative capacitance circuit 461 may be connected to the output line 161 and the current source circuit 441 via the selection circuits 451 and 452, and the negative capacitance circuit 464 may be connected to the output line 164 and the current source circuit 444 via the selection circuits 453 and 454. Thus, parasitic capacitances accompanying the output lines 161 and 164 at both ends may be reduced to shorten the operation speed (response speed and potential settling time) of the output lines 161 and 164, thereby suppressing degradation of image quality.

In FIG. 15, the output lines 161 and 163 are disposed on both sides of the output line 162, and the output lines 162 and 164 are disposed on both sides of the output line 163. Therefore, the parasitic capacitances associated with the output lines 162 and 163 are mainly associated with the other output lines constituting the output line group 16. The voltage of the output lines 161, 162, 163 and 164 often moves in a similar manner as in the example of the waveforms of the voltages VOUT1 and VOUT2 in FIG. 7, and the parasitic capacitance between these output lines hardly contributes to load capacitance. Therefore, it may be expected that the operation speeds of the output lines 162 and 163 are higher than the operation speeds of the output lines 161 and 164 positioned at both ends.

On the other hand, in the output lines 161 and 164 at both ends, since the output lines constituting the output line group 16 are disposed only on one side, parasitic capacitance is formed between the output lines 161 and 164 and a power supply voltage line or a ground voltage line (not illustrated), and the operation speed tends to be slower than that of the output lines 162 and 163. From such a viewpoint, in the present embodiment, the negative capacitance circuits 461 and 464 may be connected to the output lines 161 and 164 positioned at both ends.

In the present embodiment, the negative capacitance circuit 461 may be connected to the output line 161 and the current source circuit 441 via the selection circuits 451 and 452, and the negative capacitance circuit 464 may be connected to the output line 164 and the current source circuit 444 via the selection circuits 453 and 454. Thus, in the operation mode in which the signal of the output line 161 and the signal of the output line 164 are not read out, the operation speed of the output lines 162 and 163 may be improved.

As described above, according to the present embodiment, in the photoelectric conversion device in which the output line group arranged in each column includes a plurality of output lines, influence of parasitic capacitance accompanying the output lines may be reduced, and degradation of image quality may be suppressed.

Sixth Embodiment

Figure 16:
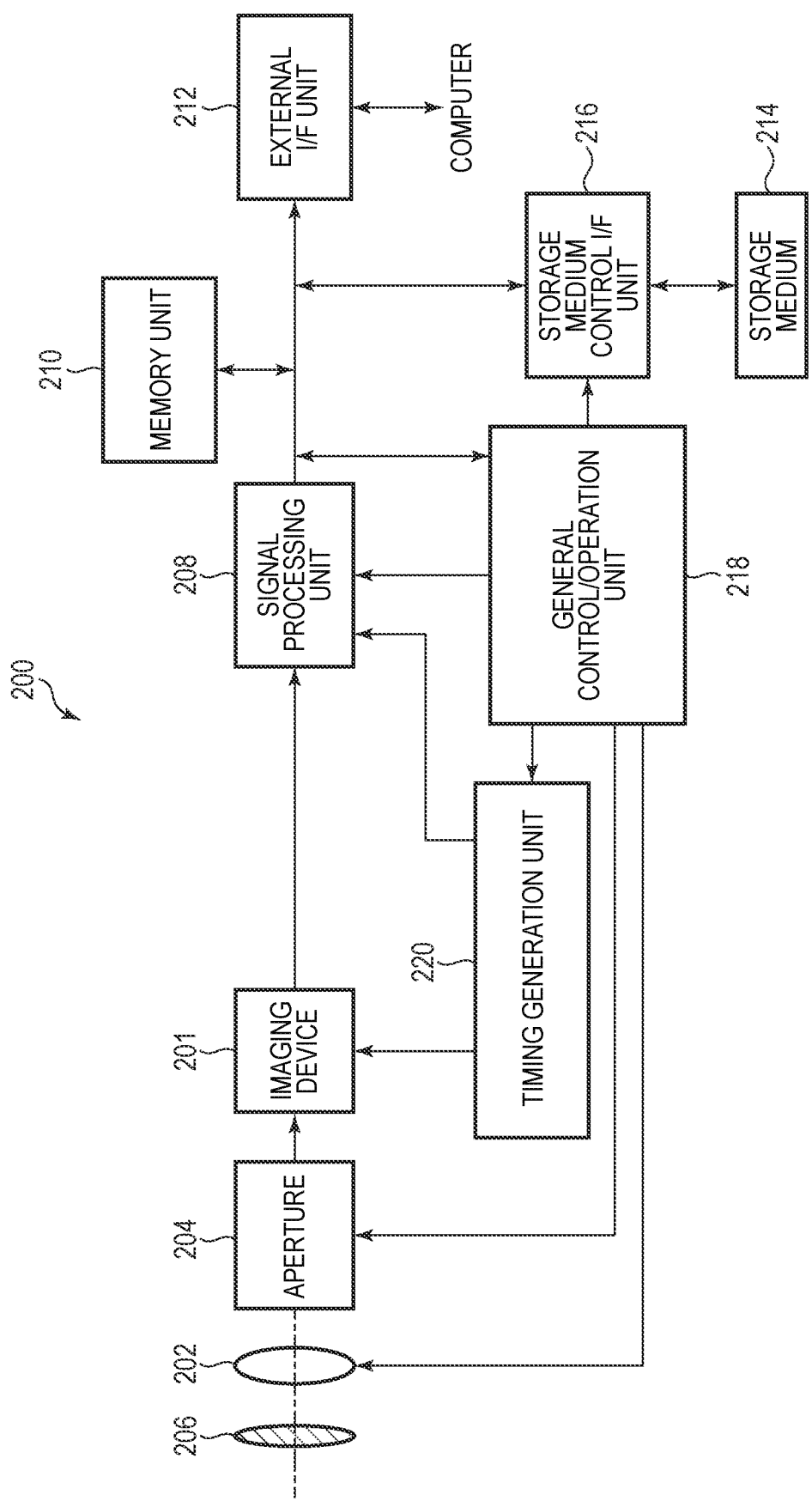
FIG. 16 is a block diagram illustrating a schematic configuration of a photoelectric conversion system according to a sixth embodiment.

A photoelectric conversion system according to a sixth embodiment will be described with reference to FIG. 16. FIG. 16 is a block diagram illustrating a schematic configuration of the photoelectric conversion system according to the present embodiment.

The photoelectric conversion device 100 described in the first to fifth embodiments may be applied to various photoelectric conversion systems. Examples of applicable photoelectric conversion system include digital still cameras, digital camcorders, surveillance cameras, copying machines, facsimiles, mobile phones, on-vehicle cameras, observation satellites, and the like. Further, a camera module including an optical system such as a lens and an imaging device is also included in the photoelectric conversion system. FIG. 16 is a block diagram of a digital still camera as an example of these.

The photoelectric conversion system 200 illustrated in FIG. 16 includes an imaging device 201, a lens 202 for forming an optical image of an object on the imaging device 201, an aperture 204 for varying an amount of light passing through the lens 202, and a barrier 206 for protecting the lens 202. The lens 202 and the aperture 204 form an optical system that collects light on the imaging device 201. The imaging device 201 is the photoelectric conversion device 100 described in any of the first to fifth embodiments, and converts an optical image formed by the lens 202 into image data.

The photoelectric conversion system 200 also includes a signal processing unit 208 that processes an output signal output from the imaging device 201. The signal processing unit 208 generates image data from a digital signal output from the imaging device 201. The signal processing unit 208 performs various corrections and compressions as necessary and outputs the processed image data. The imaging device 201 may include an AD conversion unit that generates a digital signal to be processed by the signal processing unit 208. The AD conversion unit may be formed on a semiconductor layer (semiconductor substrate) in which the photoelectric conversion unit of the imaging device 201 is formed, or may be formed on a semiconductor layer different from the semiconductor layer on which the photoelectric conversion unit of the imaging device 201 is formed. The signal processing unit 208 may be formed on the same semiconductor layer as the imaging device 201.

The photoelectric conversion system 200 further includes a memory unit 210 for temporarily storing image data, and an external interface unit (external I/F unit) 212 for communicating with an external computer or the like. Further, the photoelectric conversion system 200 includes a storage medium 214 such as a semiconductor memory for storing or reading out the captured image data, and a storage medium control interface unit (storage medium control I/F unit) 216 for storing or reading out image data on or from the storage medium 214. The storage medium 214 may be built in the photoelectric conversion system 200, or may be detachable.

The photoelectric conversion system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the photoelectric conversion system 200 may include at least the imaging device 201 and a signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize a photoelectric conversion system to which the photoelectric conversion device 100 according to the first to fifth embodiments is applied.

Seventh Embodiment

Figure 17A:
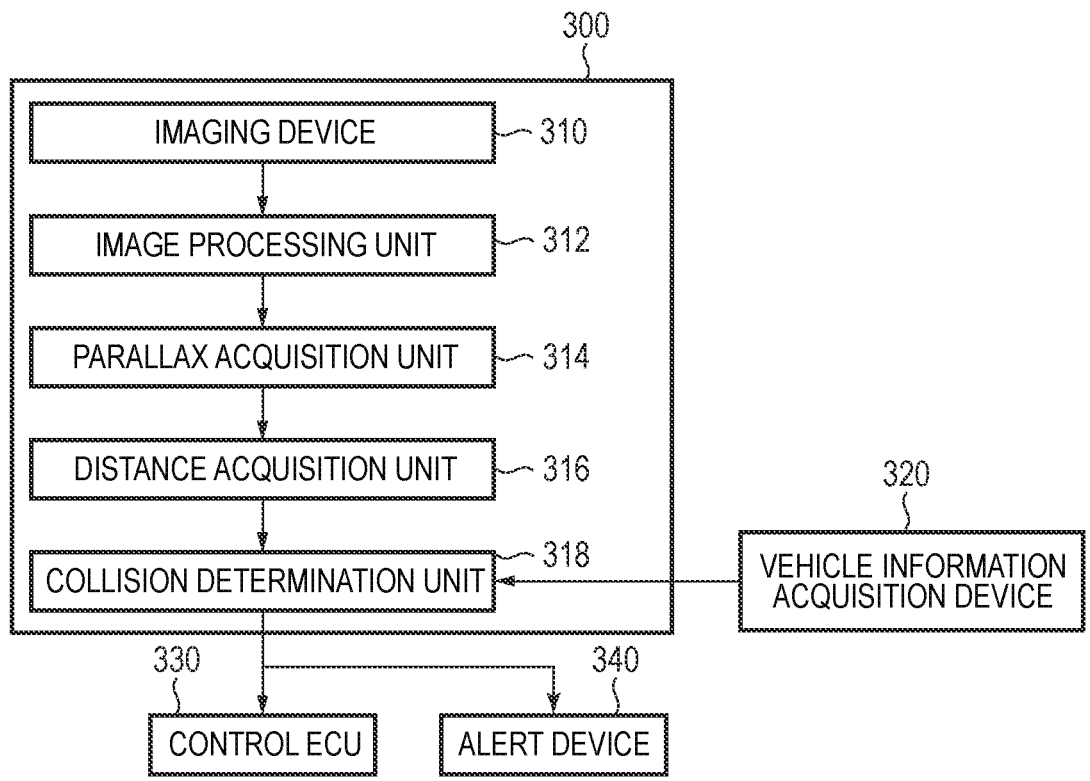
FIG. 17A is a diagram illustrating a configuration example of a photoelectric conversion system according to a seventh embodiment.
Figure 17B:
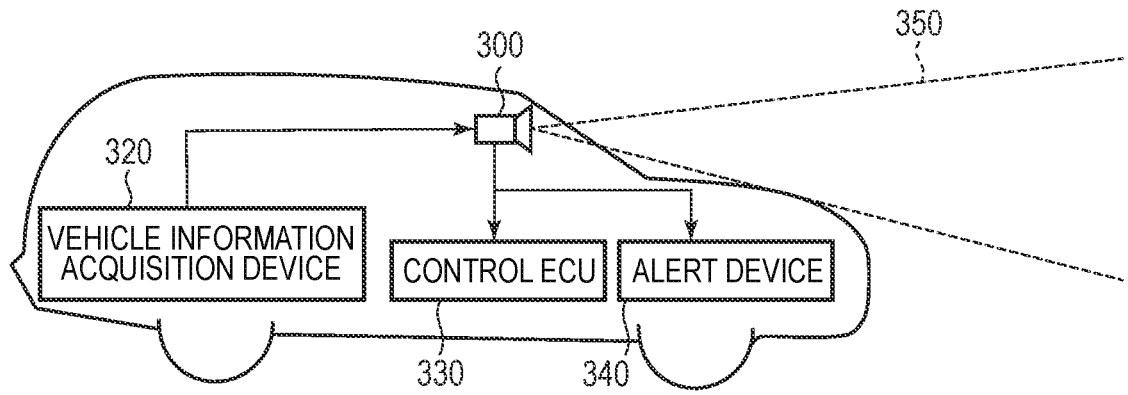
FIG. 17B is a diagram illustrating a configuration example of movable object according to the seventh embodiment.

A photoelectric conversion system and a movable object according to a seventh embodiment will be described with reference to FIG. 17A and FIG. 17B. FIG. 17A is a diagram illustrating a configuration of the photoelectric conversion system according to the present embodiment. FIG. 17B is a diagram illustrating a configuration of the movable object according to the present embodiment.

FIG. 17A illustrates an example of a photoelectric conversion system relating to an on-vehicle camera. The photoelectric conversion system 300 includes an imaging device 310. The imaging device 310 is the photoelectric conversion device 100 described in any one of the first to fifth embodiments. The photoelectric conversion system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The photoelectric conversion system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The photoelectric conversion system 300 is connected to the vehicle information acquisition device 320, and may acquire vehicle information such as a vehicle speed, a yaw rate, and a steering angle. Further, the photoelectric conversion system 300 is connected to a control ECU (Electronic Control Unit) 330 which is a control device that outputs a control signal for generating a braking force to the vehicle based on the determination result of the collision determination unit 318. The photoelectric conversion system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alarm such as a sound, displaying alert information on a screen of a car navigation system or the like, or giving vibration to a seat belt or a steering wheel.

In the present embodiment, the photoelectric conversion system 300 images the periphery of the vehicle, for example, the front side or the rear side. FIG. 17B illustrates a photoelectric conversion system in the case of imaging an image in front of a vehicle (an imaging range 350). The vehicle information acquisition device 320 sends an instruction to the photoelectric conversion system 300 or the imaging device 310. With such a configuration, the accuracy of distance measurement may be further improved.

In the above description, an example has been described in which control is performed so as not to collide with other vehicles, but the disclosure is also applicable to control of automatic driving following other vehicles, control of automatic driving so as not to go out of a lane, and the like. Further, the photoelectric conversion system is not limited to a vehicle such as a host vehicle, and may be applied to, for example, other movable objects (mobile device) such as a ship, an aircraft, or an industrial robot. In addition, the disclosure may be applied not only to a movable object, but also to wide variety of equipment that utilizes object recognition, such as an ITS (Intelligent Transport Systems).

Eighth Embodiment

Figure 18:
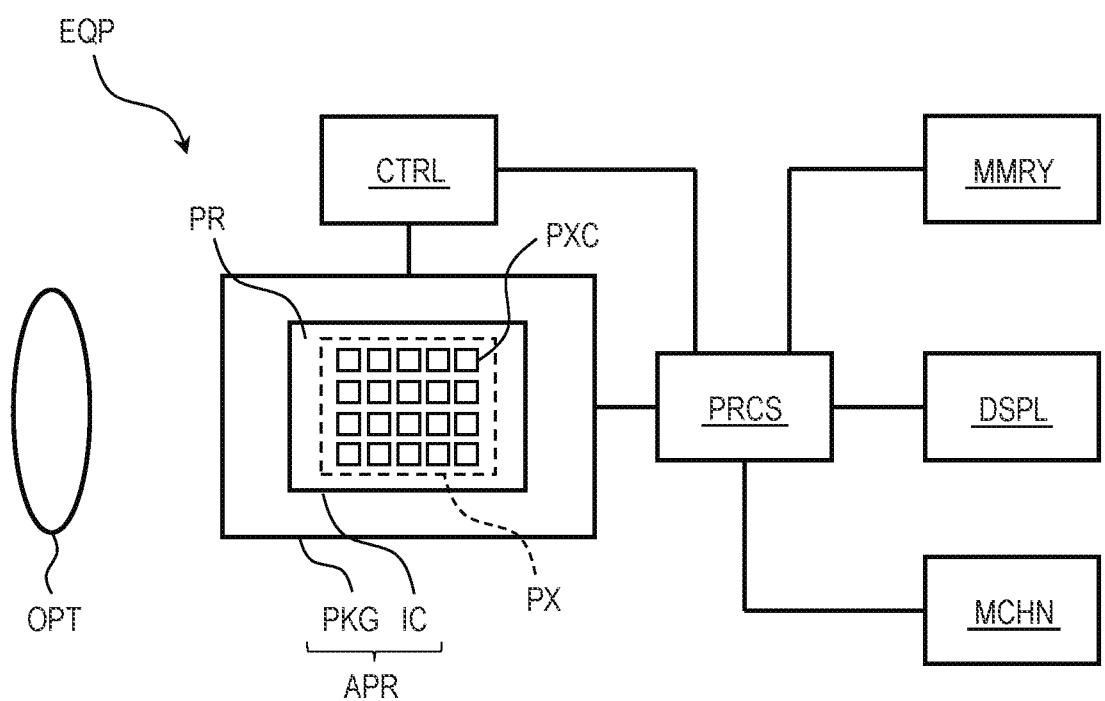
FIG. 18 is a block diagram illustrating a schematic configuration of equipment according to an eighth embodiment.

Equipment according to an eighth embodiment will be described with reference to FIG. 18. FIG. 18 is a block diagram illustrating a schematic configuration of the equipment according to the present embodiment.

FIG. 18 is a schematic diagram illustrating equipment EQP including a photoelectric conversion device APR. The photoelectric conversion device APR has the function of the photoelectric conversion device 100 of any one of the first to fifth embodiments. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC each including a photoelectric conversion unit are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrodes (TSV (Through Silicon Via)), an inter-chip interconnection by direct bonding of a conductor such as copper, a connection by micro bumps between the chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects a terminals provided on the base body to terminals provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a central processing unit (CPU) or an ASIC. The display device DSPL is an EL (electroluminescent) display device or a liquid crystal display device which displays information (image) obtained by the photoelectric conversion device APR. The storage device MMRY may be a magnetic device or a semiconductor device that stores information (images) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine.

In the equipment EQP, a signal output from the photoelectric conversion device APR may displayed on the display device DSPL, and is transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 18 may be an electronic device such as an information terminal (for example, a smartphone or a wearable terminal) having a photographing function or a camera (For example, an interchangeable lens camera, a compact camera, a video camera, and a surveillance camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The disclosure is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the disclosure.

The circuit configurations of the pixel 12 illustrated in FIG. 2 and FIG. 13 are an example, and may be appropriately changed. For example, each pixel 12 may include two or more photoelectric conversion elements. In this case, a plurality of photoelectric conversion elements may share one FD node. Further, a plurality of photoelectric conversion elements may be a pupil-division pixel sharing one microlens so that phase difference may be detected. The pixel 12 does not necessarily have to include the select transistor M4. The capacitance value of the node FD may be switchable.

Further, in the above-described embodiments, the example in which the slope-type AD conversion circuit is used for the AD conversion of the pixel signal has been described, but the AD conversion circuit used for the AD conversion of the pixel signal is not limited to the slope-type AD conversion circuit. In addition to the slope-type AD conversion circuit, for example, a SAR (Successive Approximation Register) type AD conversion circuit, a delta-sigma type AD conversion circuit, a pipeline type AD conversion circuit, or the like may be applied to the AD conversion of the pixel signal.

The photoelectric conversion systems described in the sixth and seventh embodiments are examples of photoelectric conversion systems to which the photoelectric conversion device of the disclosure may be applied, and the photoelectric conversion system to which the photoelectric conversion device of the disclosure may be applied is not limited to the configurations illustrated in FIG. 16 and FIG. 17A.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-045442, filed Mar. 22, 2023, which is hereby incorporated by reference herein in its entirety.

What is claimed is:

1. A photoelectric conversion device comprising:
a plurality of pixels arranged to form a column, each of the plurality of pixels being configured to output a signal based on charge generated in a photoelectric conversion unit;
a plurality of output lines provided corresponding to the column, each of the plurality of output lines being connected to at least one of the plurality of pixels; and
a column circuit connected to the plurality of output lines,
wherein the plurality of output lines includes a first output line and a second output line, and
wherein the column circuit includes a speed-up circuit configured to promote a change in potential, and a selection circuit configured to select one of the first output line and the second output line and connect the selected one to the speed-up circuit.

2. The photoelectric conversion device according to claim 1, wherein the column circuit includes a plurality of current source circuits provided corresponding to the plurality of output lines, and each of the current source circuits is configured to supply a current to the pixel connected to the corresponding output line.

3. The photoelectric conversion device according to claim 2, wherein the selection circuit is provided between a first current source circuit corresponding to the first output line and a second current source circuit corresponding to the second output line, and the speed-up circuit.

4. The photoelectric conversion device according to claim 2, wherein the selection circuit is provided between the first output line and the second output line, and a first current source circuit corresponding to the first output line and a second current source circuit corresponding to the second output line.

5. The photoelectric conversion device according to claim 2, wherein the speed-up circuit includes a negative capacitance circuit.

6. The photoelectric conversion device according to claim 5,
wherein each of the plurality of current source circuits includes a first transistor including a first main node connected to the corresponding output line, and
wherein the negative capacitance circuit is configured to be connectable between the first main node and the second main node of the first transistor of the first current source circuit corresponding to the first output line or between the first main node and the second main node of the first transistor of the second current source circuit corresponding to the second output line.

7. The photoelectric conversion device according to claim 6, wherein the negative capacitance circuit includes an amplifier including an input node to be connectable to the first main node of the first transistor, and a capacitor including one terminal connected to an output node of the amplifier and the other terminal to be connectable to the second main node of the first transistor.

8. The photoelectric conversion device according to claim 5, wherein a capacitance value of the negative capacitance circuit is smaller than a capacitance value of a parasitic capacitance accompanying the first output line and a capacitance value of a parasitic capacitance accompanying the second output line.

9. The photoelectric conversion device according to claim 2, wherein the speed-up circuit includes a current circuit temporarily connected to the first output line or the second output line when a potential of the first output line or the second output line changes.

10. The photoelectric conversion device according to claim 1, wherein the speed-up circuit includes a first speed-up circuit configured to be connectable to the first output line and the second output line via the selection circuit, and a second speed-up circuit connected to the second output line.

11. The photoelectric conversion device according to claim 10, wherein each of the plurality of pixels is configured to be connectable to the first output line and the second output line.

12. The photoelectric conversion device according to claim 1,
wherein the plurality of output lines further includes a third output line and a fourth output line,
wherein the speed-up circuit includes a first speed-up circuit and a second speed-up circuit, and
wherein the column circuit includes a first selection circuit configured to select one of the first output line and the second output line and connect the selected one to the first speed-up circuit, and a second selection circuit configured to select one of the third output line and the fourth output line and connect the selected one to the second speed-up circuit.

13. The photoelectric conversion device according to claim 1, wherein the plurality of output lines further includes a fifth output line disposed between the first output line and the second output line.

14. The photoelectric conversion device according to claim 1 further comprising a control circuit configured to control the selection circuit,
wherein the control circuit is configured to select the second output line by the selection circuit when a capacitance value of a parasitic capacitance accompanying the first output line is larger than a capacitance value of a parasitic capacitance accompanying the second output line.

15. The photoelectric conversion device according to claim 1 further comprising a control circuit configured to control the selection circuit,
wherein the control circuit is configured to select the first output line by the selection circuit when a first capacitance value of a parasitic capacitance accompanying the first output line is larger than a second capacitance value of a parasitic capacitance accompanying the second output line, and to decrease a difference of a settling time of potential caused by a difference between the first capacitance value and the second capacitance value.

16. A photoelectric conversion system comprising:
the photoelectric conversion device according to claim 1; and
a signal processing device configured to process a signal output from the photoelectric conversion device.

17. A movable object comprising:
the photoelectric conversion device according to claim 1; and
a distance information acquisition unit configured to acquire distance information to an object from a parallax image based on a signal from the photoelectric conversion device; and
a control unit configured to control the movable object based on the distance information.

18. An equipment comprising:
the photoelectric conversion device according to claim 1, and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

* * * * *